United States Patent
Aoshima

(10) Patent No.: US 7,443,061 B2
(45) Date of Patent: Oct. 28, 2008

(54) DRIVING DEVICE

(75) Inventor: Chikara Aoshima, Zama (JP)

(73) Assignee: Canon Kabushiki Kaisha (JP)

( * ) Notice: Subject to any disclaimer, the term of this patent is extended or adjusted under 35 U.S.C. 154(b) by 437 days.

(21) Appl. No.: 11/391,658

(22) Filed: Mar. 28, 2006

(65) Prior Publication Data

US 2006/0214521 A1    Sep. 28, 2006

(30) Foreign Application Priority Data

Mar. 28, 2005    (JP)    ............... 2005-092282

(51) Int. Cl.
  *H02K 37/14*    (2006.01)
  *H02K 1/14*    (2006.01)
(52) U.S. Cl. ............... 310/49 R; 310/156.43; 310/156.47; 310/257
(58) Field of Classification Search ........... 310/40 MM, 310/49 R, 156.43, 156.47, 257
See application file for complete search history.

(56) References Cited

U.S. PATENT DOCUMENTS

| | | | |
|---|---|---|---|
| 5,283,487 A * | 2/1994 | Oki et al. | 310/49 R |
| 6,853,105 B2 * | 2/2005 | Nakano et al. | 310/156.47 |
| 7,034,424 B2 * | 4/2006 | Kometani et al. | 310/156.47 |
| 2006/0244336 A1 * | 11/2006 | Makita et al. | 310/216 |

FOREIGN PATENT DOCUMENTS

| | | | |
|---|---|---|---|
| JP | 9-0331666 A | | 12/1997 |
| JP | 10-229670 A | | 8/1998 |
| JP | 10229669 A | * | 8/1998 |
| JP | 11289738 A | * | 10/1999 |
| JP | 2000236654 A | * | 8/2000 |

* cited by examiner

*Primary Examiner*—Tran Nguyen
(74) *Attorney, Agent, or Firm*—Rossi, Kimms & McDowell, LLP

(57) ABSTRACT

A driving device which is capable of delivering higher power and can be reduced in size. A hollow-cylindrical magnet (1) is magnetized so as to have circumferentially alternately different poles. First and second coils (2 and 3) are arranged concentric with the magnet (1) on respective axially opposite sides thereof. Tooth-shaped first and second outer magnetic pole parts (8A, 8B, 8C, 8D, 9A, 9B, 9C, and 9D) are arranged in opposed relation to the magnet (1) to extend from respective opposite end faces of the magnet (1), for being magnetized by the first and second coils (2 and 3). A rotary shaft (10) fixed to an inner periphery of the magnet (1) is formed with an inner magnetic pole part (10A) disposed in opposed relation to the first and second outer magnetic pole parts (8A, 8B, 8C, 8D, 9A, 9B, 9C, and 9D), for being magnetized by the first and second coils (2 and 3). The first and second outer magnetic pole parts (8A, 8B, 8C, 8D, 9A, 9B, 9C, and 9D) are each formed into a spiral shape.

6 Claims, 12 Drawing Sheets

DRIVING DEVICE

BACKGROUND OF THE INVENTION

1. Field of the Invention

The present invention relates to a driving device typically implemented as an improved hollow cylindrical stepper motor.

2. Description of the Related Art

Conventionally, there has been proposed a stepper motor which is reduced in the diameter about a rotor shaft (rotary shaft) thereof and is at the same time enhanced in output power (see e.g. Japanese Laid-Open Patent Publication (Kokai) No. H09-331666). Now, a stepping motor (stepper motor) according to the prior art disclosed in this publication will be described with reference to FIGS. 13 and 14.

FIG. 13 is an exploded perspective view of the conventional stepper motor, and FIG. 14 is a cross-sectional view of the stepper motor shown in FIG. 13, in a state in which the assembly of the stepper motor is completed.

As shown in FIGS. 13 and 14 the stepper motor is comprised of a rotor 201, a first coil 202, a second coil 203, a first stator 204, a second stator 205, an output shaft 206, and a connection ring 207.

The rotor 201 has a hollow cylindrical shape, and is formed by a permanent magnet (magnet) which is circumferentially divided into four sections which are magnetized such that they have alternately different poles. The first coil 202 and the second coil 203 are arranged adjacent to the rotor 201 on axially opposite sides of the rotor 201. The first stator 204 is formed of a soft magnetic material, and is magnetized by the first coil 202. The second stator 205 is formed of a soft magnetic material, and is magnetized by the second coil 203.

The first stator 204 includes first outer magnetic pole parts 204A and 204B which are opposed to an outer peripheral surface of the rotor 201 with a gap between the first outer magnetic pole parts 204A and 204B and the outer peripheral surface of the rotor 201, and first inner magnetic pole parts 204C and 204D which are opposed to an inner peripheral surface of the rotor 201 with a gap between the first inner magnetic pole parts 204C and 204D and the inner peripheral surface of the rotor 201. The second stator 205 includes second outer magnetic pole parts 205A and 205B which are opposed to the outer peripheral surface of the rotor 201 with a gap between the second outer magnetic pole parts 205A and 205B and the outer peripheral surface of the rotor 201, and second inner magnetic pole parts 205C and 205D which are opposed to the inner peripheral surface of the rotor 201 with a gap between the second inner magnetic pole parts 205C and 205D and the inner peripheral surface of the rotor 201.

The output shaft 206 has the rotor 201 rigidly secured thereto, and is rotatably held by a bearing 204E of the first stator 204 and a bearing 205E of the second stator 205. The connection ring 207 is formed of a non-magnetic material, and holds the first stator 204 and the second stator 205 with a predetermined gap between the first stator 204 and the second stator 205.

With the construction described above, the energizing direction of the first coil 202 and that of the second coil 203 are switched to thereby switch the polarities of the first outer magnetic pole parts 204A and 204B, the first inner magnetic pole portions 204C and 204D, the second outer magnetic pole parts 205A and 205B, and the second inner magnetic pole parts 205C and 205D. This causes the rotor 201 to keep rotating.

In the above-described stepper motor, magnetic fluxes generated by energization of the first coil 202 and the second coil 203 are allowed to flow from the outer magnetic pole parts to the inner magnetic pole parts radially opposed thereto, or alternatively from the inner magnetic pole parts to the outer magnetic pole parts radially opposed thereto, so that the magnetic fluxes efficiently act on the magnet forming the rotor 201 located between the outer magnetic pole parts and the respective associated inner magnetic pole parts. Further, the distance between each outer magnetic pole part and the associated inner magnetic pole part can be set to a value almost equal to the thickness of the hollow cylindrical magnet, and hence it is possible to reduce the resistance of a magnetic circuit formed by the outer magnetic pole parts and the inner magnetic pole parts. As the resistance of the magnetic circuit is smaller, a larger amount of magnetic flux can be generated with a smaller amount of electric current, which leads to the enhancement of output power of the stepper motor.

Further, a stepper motor as a further improvement of the above-described stepper motor has been proposed (see e.g. Japanese Laid-Open Patent Publication (Kokai) No. H10-229670). In the proposed stepper motor, inner magnetic pole parts are formed as parts of hollow cylindrical members, with an output shaft made of a soft magnetic material being inserted into the respective holes of the hollow cylindrical members, and bearings made of a non-magnetic material are attached to a stator provided with the inner magnetic pole parts and outer magnetic pole parts, for rotatably holding the output shaft. According to the proposed stepper motor, the output shaft as well can be used as a component of the magnetic circuit, which contributes to an increase in the output power of the stepper motor increased.

However, the stepper motors disclosed in Japanese Laid-Open Patent Publications (Kokai) No. H09-331666, and No. H10-229670 both necessitate provision of predetermined gaps between the inner peripheral surface of the magnet forming the rotor and the outer peripheral surfaces of the inner magnetic pole parts opposed thereto. The control of the predetermined gaps during manufacturing of the stepper motors results increase manufacturing costs. Further, although the stators are required to be formed with hollow cylindrical inner magnetic pole parts and outer magnetic pole parts, it is difficult to integrally form the inner magnetic pole parts and the outer magnetic pole parts. Further, in the case where the inner magnetic pole parts and the outer magnetic pole parts are separately formed, and then assembled together into one piece, this increases the number of component parts, which results in an increase in the manufacturing costs.

Further, in the case of the stepper motor disclosed in Japanese Laid-Open Patent Publication (Kokai) No. H09-331666, if the first outer magnetic pole parts of the first stator and the second outer magnetic pole parts of the second stator are made closer to each other, crosstalk is induced therebetween, whereby rotational accuracy and rotational output are degraded. To solve this problem, the gap T1 is axially provided between the first outer magnetic pole parts and the second outer magnetic pole parts.

Assuming that the number of the magnetic poles of the magnet forming the rotor is equal to n, the first outer magnetic pole parts and the second outer magnetic pole parts are arranged on the outer peripheral surface of the rotor in a manner shifted in phase by (180/n) degrees. Moreover, the first outer magnetic pole parts are arranged at n/2 locations at an angular pitch of 720/n degrees through an opposed angle of not more than 360/n degrees with respect to the outer peripheral surface of the rotor, and the second outer magnetic pole parts are also arranged at n/2 locations at an angular pitch of 720/n degrees through an opposed angle of not more than 360/n degrees with respect to the outer peripheral surface of the rotor. Therefore, unless the gap T1 is axially provided between the first outer magnetic pole parts and the second outer magnetic pole parts, the former and the latter are brought into contact with each other.

Further, since the gap T1 is provided between the first outer magnetic pole parts and the respective associated second outer magnetic pole parts, the axial length of the first outer magnetic pole parts opposed to the rotor is equal to (ML−T1)/2 where ML represents the axial length of the rotor. This means that the rotor is not effectively utilized, and particularly when the axial size of the stepper motor is reduced, the output power of the stepper motor is lowered.

SUMMARY OF THE INVENTION

It is an object of the present invention to provide a driving device which is capable of delivering higher power and can be reduced in size.

To attain the above object, in a first aspect of the present invention, there is provided a driving device comprising a magnet that has a hollow cylindrical shape and is magnetized so as to have alternately different poles in a circumferential direction thereof, a first coil and a second coil that are arranged concentric with the magnet and disposed on axially opposite sides of the magnet, respectively, first outer magnetic pole parts that each have a tooth shape and are arranged in opposed relation to the magnet to extend from a side close to one axial end face of the magnet along an outer peripheral surface of the magnet, for being magnetized by the first coil, second outer magnetic pole parts that each have a tooth shape and are arranged in opposed relation to the magnet to extend from a side close to another axial end face of the magnet along the outer peripheral surface of the magnet, for being magnetized by the second coil, and a rotary shaft that is fixed to an inner periphery of the magnet, and has an inner magnetic pole part disposed in opposed relation to at least either of the first outer magnetic pole parts and the second outer magnetic pole parts, for being magnetized by at least one of the first coil and the second coil, wherein the first outer magnetic pole parts and the second outer magnetic pole parts are each formed into a spiral shape.

With the arrangement of the driving device according to the first aspect of the present invention, first outer magnetic pole parts and second outer magnetic pole parts are each formed into a spiral shape along an outer peripheral surface of a magnet, or alternatively the magnet is spirally magnetized, whereby an area is increased where magnetized parts of the magnet and the first outer magnetic pole parts or the second outer magnetic pole parts are opposed to each other, while preventing crosstalk between the first outer magnetic pole parts and the second outer magnetic pole parts. This makes it possible to make effective use of the magnet, thereby increasing the output torque of the driving device.

Further, the driving device is only required to have a diameter large enough to include the diameter of the magnet, and cause the first and second outer magnetic pole parts to be opposed to the outer peripheral surface of the magnet. This makes it possible to reduce the size of the driving device.

Further, compared with the case where the inner magnetic pole parts and the outer magnetic pole parts are integrally formed with each other, as in the above-described examples of the prior art, it is easier to manufacture the driving device according to the present invention, and hence it is possible to reduce the manufacturing costs of the device.

Preferably, front ends of the first outer magnetic pole parts and front ends of respective associated ones of the second outer magnetic pole parts overlap each other in an axial direction of the magnet.

Preferably, phase positions of the first outer magnetic pole parts with respect to respective corresponding magnetization phases of magnetized parts of the magnet and phase positions of the respective associated ones of the second outer magnetic pole parts with respect to the respective corresponding magnetization phases of the magnetized parts of the magnet are shifted, respectively, therebetween by a predetermined angle.

To attain the above object, in a second aspect of the present invention, there is provided a driving device comprising a magnet that has a hollow cylindrical shape and is magnetized so as to have alternately different poles in a circumferential direction thereof, a first coil and a second coil that are arranged concentric with the magnet and disposed on axially opposite sides of the magnet, respectively, first outer magnetic pole parts that each have a tooth shape and are arranged in opposed relation to the magnet to extend from a side close to one axial end face of the magnet along an outer peripheral surface of the magnet, for being magnetized by the first coil, second outer magnetic pole parts that each have a tooth shaped and are arranged in opposed relation to the magnet to extend from a side close to another end face of the magnet along the outer peripheral surface of the magnet, for being magnetized by the second coil, and a rotary shaft that is fixed to an inner periphery of the magnet, and has an inner magnetic pole part disposed in opposed relation to at least either of the first outer magnetic pole parts and the second outer magnetic pole parts, for being magnetized by at least one of the first coil and the second coil, wherein the magnet is spirally magnetized.

With the arrangement of the driving device according to the second aspect of the present invention, it is possible to obtain the same advantageous effects as provided by the driving device according to the first aspect of the present invention Preferably, front ends of the first outer magnetic pole parts and front ends of respective associated ones of the second outer magnetic pole parts overlap each other in an axial direction of the magnet.

Preferably, a relationship between an angle θ3 through which each of the first outer magnetic pole parts extends in opposed relation to a corresponding one of magnetic pole parts of the magnet, an angle θ4 through which each of the second outer magnetic pole parts extend in opposed relation to a corresponding one of the magnetic pole parts of the magnet, and an angle θ5 as a phase difference between each of the first outer magnetic pole parts and each of the second outer magnetic pole part adjacent to the each of the first outer magnetic pole parts is set such that θ5>(θ3+θ4)/2 holds.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail below with reference to the drawings showing preferred embodiments thereof.

Figure 1:
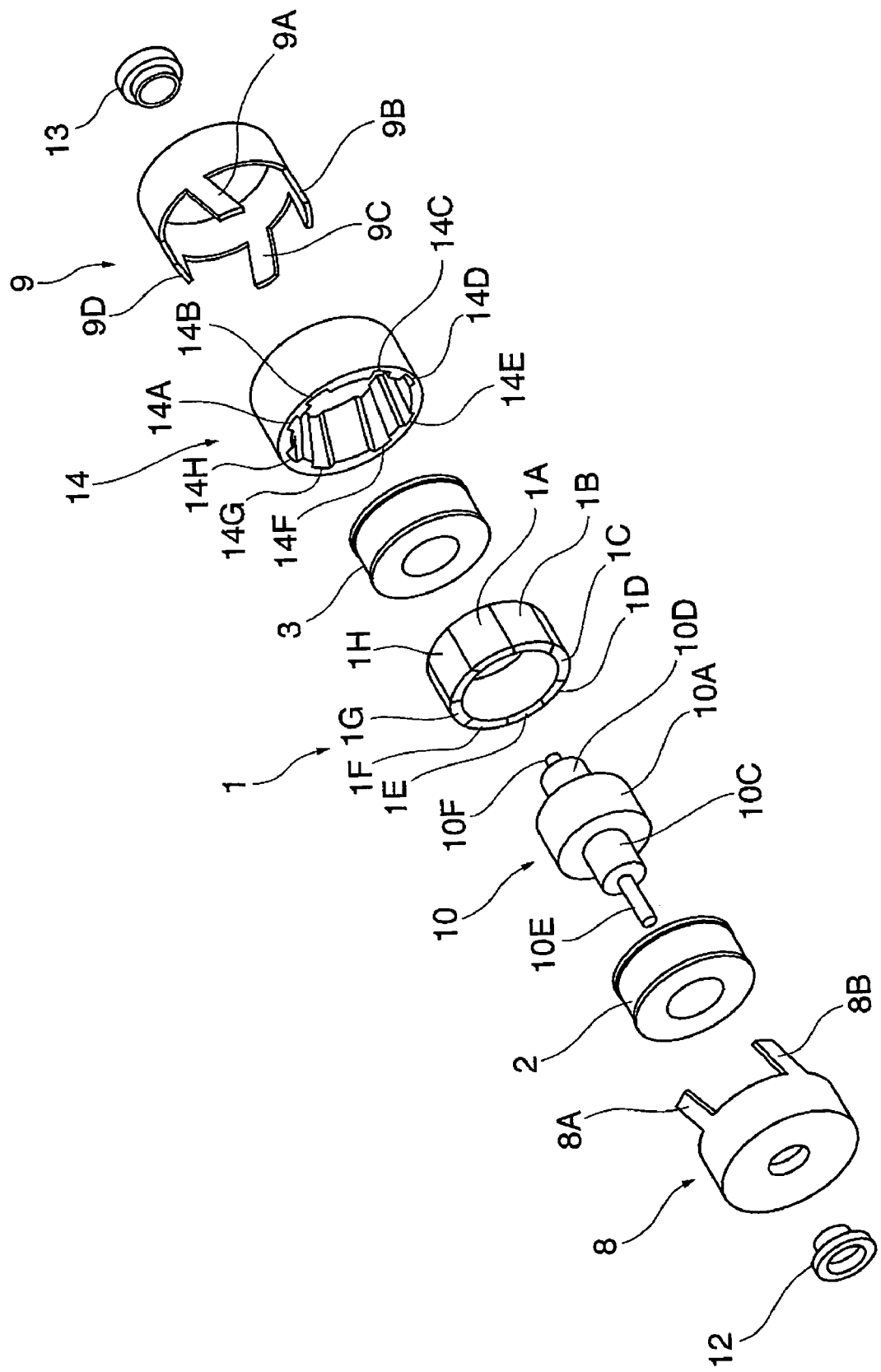
FIG. 1 is an exploded perspective view of a stepper motor according to a first embodiment of the present invention.
Figure 2:
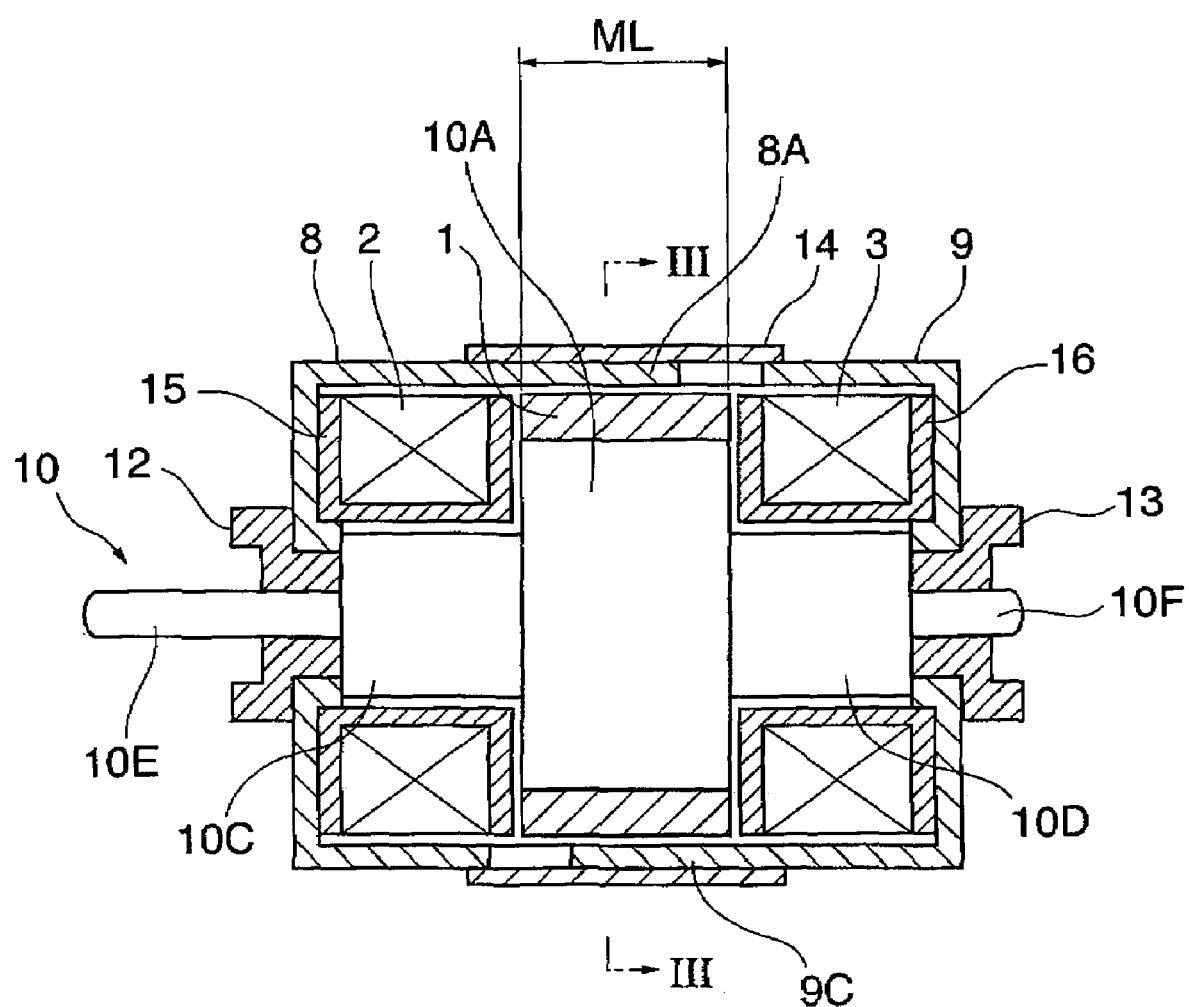
FIG. 2 is a cross-sectional view of the stepper motor shown in FIG. 1, in a state in which the assembly of the stepper motor is completed.
Figure 3:
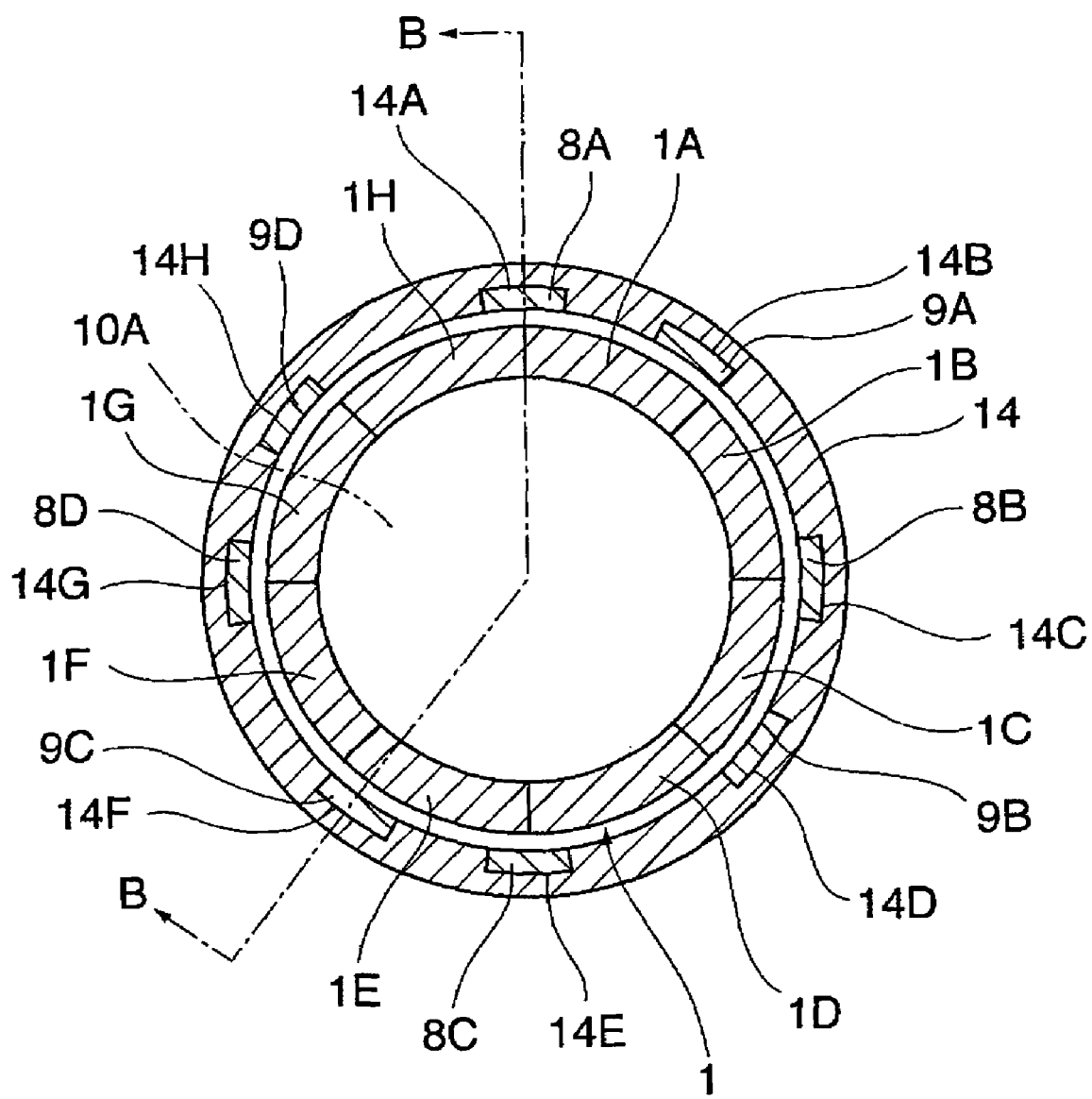
FIG. 3 a cross-sectional view of the stepper motor, taken on line III-III of FIG. 2.
Figure 4:
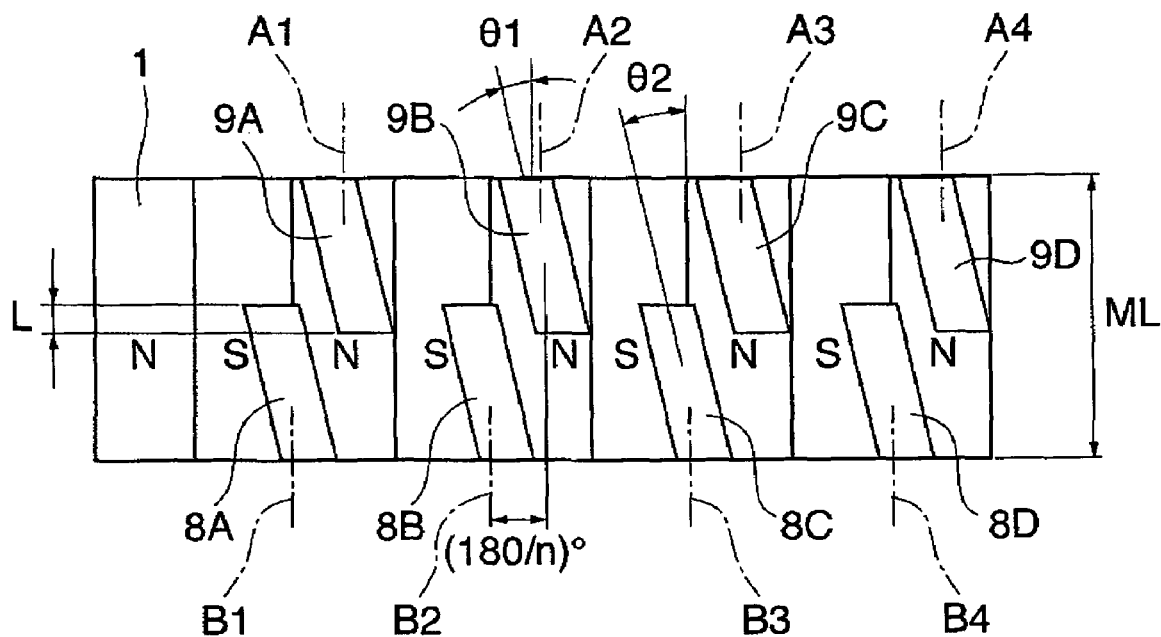
FIG. 4 is an unfolded plan view showing the relationship between outer magnetic pole parts of stators and a magnet ring.

FIG. 1 is an exploded perspective view of a stepper motor according to a first embodiment of the present invention. FIG. 2 is a cross-sectional view of the stepper motor shown in FIG. 1, in a state in which the assembly of the stepper motor is completed, and FIG. 3 is a cross-sectional view of the stepper motor, taken on line A-A of FIG. 2. Further, FIG. 4 is an unfolded plan view showing the relationship between outer magnetic pole parts of stators and a magnet ring, and FIGS. 5 to 8 are unfolded plan views useful in explaining rotational motion of the magnet ring.

As shown in FIGS. 1 to 8, the stepper motor is comprised of the magnet ring 1, a first coil 2, a second coil 3, a first stator 8, a second stator 9, a rotary shaft 10, a first bearing 12, a second bearing 13, a connection ring 14, a first bobbin 15, and a second bobbin 16.

The magnet ring 1 forms a rotor, and is formed into a hollow cylindrical shape. The magnet ring has a peripheral wall thereof circumferentially divided at equal space intervals into n magnetized sections (eight sections in the present embodiment (n represents an integer)) 1A, 1B, 1C, 1D, 1E, 1F, 1G, and 1H, which are magnetized to have alternating S and N poles. The outer peripheral surfaces of the magnetized sections 1A, 1C, 1E, and 1G provide S poles, and the outer peripheral surfaces of the other magnetized sections 1B, 1D, 1F, and 1H provide N poles. The magnet ring 1 is implemented by a plastic magnet formed by injection molding, and has a simple shape, which makes it easy to form the same as one compact in size and thin. Further, even when the magnet ring 1 is assembled by press-fitting, it does not develop cracking.

The first coil 2 is formed into a hollow cylindrical shape, and is wound around a hollow cylindrical part of the first bobbin 15. In assembling the stepper motor, the first coil 2 is disposed across the magnet ring 1 from the second coil 3 in a state in which the axis of the first coil 2 coincides with that of the magnet ring 1. Further, the first coil 2 is formed to have an outer diameter which is approximately equal to the outer diameter of the magnet ring 1.

The second coil 3 is formed into a hollow cylindrical shape, and is wound around a hollow cylindrical part of the second bobbin 16. In assembling the stepper motor, the second coil 3 is disposed across the magnet ring 1 from the first coil 2 in a state in which the axis of the second coil 3 coincides with that of the magnet ring 1. Further, the second coil 3 is formed to have an outer diameter which is approximately equal to the outer diameter of the magnet ring 1.

The first stator 8 is formed of a soft magnetic material, and is comprised of an outer tube part having a hollow cylindrical shape, tooth-shaped parts as outer magnetic pole parts, and cutouts. The first stator 8 is magnetized by the first coil 2. The tooth-shaped parts of the first stator 8 form first outer magnetic pole parts 8A, 8B, 8C, and 8D which are opposed to the outer peripheral surface of the magnet ring 1 with a predetermined gap between the first outer magnetic pole portions parts and the outer peripheral surface of the magnet ring 1, and spirally extend along the outer peripheral surface of the magnet ring 1 from a stator body disposed on the side close to one end face of the magnet ring 1.

The first outer magnetic pole parts 8A, 8B, 8C, and 8D are formed by spirally cutting out the front end of a hollow cylindrical soft magnetic material such that the front end is circumferentially divided into tooth shapes each of which axially extends from the end face of the outer tube part. The n/2 (i.e. four) of the first outer magnetic pole parts 8A, 8B, 8C, and 8D are arranged at phase intervals of 720/n (i.e. 90 degrees) in terms of mechanical angle, i.e. at phase intervals of 360 degrees in terms of electrical angle.

The second stator 9 is formed of a soft magnetic material, and is comprised of an outer tube part having a hollow cylindrical shape, tooth-shaped parts as outer magnetic pole parts, and cutouts. The second stator 9 is magnetized by the second coil 3. The tooth-shaped parts of the second stator 9 form second outer magnetic pole parts 9A, 9B, 9C, and 9D which are opposed to the outer peripheral surface of the magnet ring 1 with a predetermined gap between the second outer magnetic pole parts and the outer peripheral surface of the magnetic ring 1, and spirally extend along the outer peripheral surface of the magnet ring 1 from a stator body disposed on the side close to the other end face of the magnet ring 1.

The second outer magnetic pole parts 9A, 9B, 9C, and 9D are formed by spirally cutting out the front end of the hollow cylindrical soft magnetic material such that the front end is circumferentially divided into tooth shapes each of which axially extends from the end face of the outer tube part. The n/2 (i.e. four) of the second outer magnetic pole parts 9A, 9B, 9C, and 9D are arranged at phase intervals of 720/n (i.e. 90 degrees) in terms of mechanical angle, i.e. at phase intervals of 360 degrees in terms of electrical angle.

As described above, the first outer magnetic pole parts 8A, 8B, 8C, and 8D of the first stator 8, and the second outer magnetic pole parts 9A, 9B, 9C, and 9D of the second stator 9 are each formed by a tooth-shaped part spirally extending along the outer peripheral surface of the magnet ring 1, and the cutouts. With this configuration, the outer magnetic pole parts can be formed while minimizing the diameter of the stepper motor. That is, if the outer magnetic pole parts are formed as radial projections of the stators, this increases the diameter of the stepper motor. However, in the present embodiment, the outer magnetic pole parts are formed by the tooth-shaped parts and cutouts which axially extend, and hence it is possible to reduce the diameter of the stepper motor to the minimum.

The first outer magnetic pole parts 8A, 8B, 8C, and 8D of the first stator 8, and the second outer magnetic pole parts 9A, 9B, 9C, and 9D of the second stator 9 have the same shape, and are arranged such that the front ends of the tooth-shaped parts of the first outer magnetic pole parts and the front ends of the respective associated ones of the tooth-shaped parts of the second outer magnetic pole parts are arranged in opposite directions toward each other. Further, since the first outer magnetic pole parts 8A, 8B, 8C, and 8D of the first stator 8, and the second outer magnetic pole parts 9A, 9B, 9C, and 9D of the second stator 9 are spirally formed, the tooth-shaped front ends of the first outer magnetic pole parts and those of the respective corresponding ones of the second outer magnetic pole parts are arranged such that they extend away from each other in the circumferential direction.

Since the first outer magnetic pole parts 8A, 8B, 8C, and 8D of the first stator 8 are spirally formed, the phase relationship of each first outer magnetic pole part to the associated magnetized part of the magnet ring 1 varies between different portions of the first outer magnetic pole part which are different in position in the axial direction of the magnet ring 1. More specifically, the phase relationship of a front end portion of each of the first outer magnetic pole parts 8A, 8B, 8C, and 8D (front end portion of each tooth-shaped part) to the associated magnetized part of the magnet ring 1 differs from that of a root portion of the first outer magnetic pole part (portion close to one end face of the magnet ring 1) to the associated magnetized part.

Referring to FIG. 4, a spiral angle of the first outer magnetic pole parts 8A, 8B, 8C, and 8D with respect to the associated boundaries between the magnetized parts 1A to 1H of the magnet ring 1 is represented by θ2. An average phase position of different portions of the first outer magnetic pole part 8A with respect to the associated magnetized part of the magnet ring 1 is at a location indicated by B1. Similarly, average phase positions of the first outer magnetic pole parts 8B, 8C, and 8D with respect to the associated magnetized parts of the magnet ring 1 are at respective locations indicated by B2, B3, and B4.

Similarly, since the second outer magnetic pole parts 9A, 9B, 9C, and 9D of the second stator 9 are spirally formed, the phase relationship of each second outer magnetic pole part to the associated magnetized part of the magnet ring 1 in opposed relation to the second outer magnetic pole part varies between different portions of the second outer magnetic pole part which are different in position in the axial direction of the magnet ring 1. More specifically, the phase relationship of a front end of each of the second outer magnetic pole parts 9A, 9B, 9C, and 9D (front end portion of each tooth-shaped part) to the associated magnetized part of the magnet ring 1 differs from that of a root portion of the first outer magnetic pole part (portion close to the other end face of the magnet ring 1) to the associated magnetized part.

Referring to FIG. 4, a spiral angle of the second outer magnetic pole parts 9A, 9B, 9C, and 9D with respect to the associated boundaries between the magnetized parts 1A to 1H of the magnet ring 1 is represented by θ1. An average phase position of the second outer magnetic pole part 9A with respect to the associated magnetized part of the magnet ring 1 is at a location indicated by A1. Similarly, average phase positions of the second outer magnetic pole parts 9B, 9C, and 9D with respect to the associated magnetized parts of the magnet ring 1 are at respective locations indicated by A2, A3, and A4.

Each of the average phase positions B1, B2, B3, and B4 of the respective first outer magnetic pole parts 8A, 8B, 8C, and 8D, is shifted from the corresponding one of the average phase positions A1, A2, A3, and A4 of the respective second outer magnetic pole parts 9A, 9B, 9C, and 9D in phase by 90 degrees in terms of electrical angle, i.e. at (180/n) degrees (22.5 degrees in the present embodiment) in terms of mechanical angle, with respect to the magnetization phases of the magnetized parts of the magnet ring 1.

As shown in FIG. 4, the first outer magnetic pole parts 8A, 8B, 8C, and 8D are spirally arranged at an angle of θ2 with respect to the associated boundaries between the magnetized parts of the magnet ring 1. The second outer magnetic pole parts 9A, 9B, 9C, and 9D of the second stator 9 are spirally arranged at an angle of θ1 with respect to the associated boundaries between the magnetized parts of the magnet ring 1. Due to their spiral shape, the front ends of the first outer magnetic pole parts 8A, 8B, 8C, and 8D, and the front ends of the respective associated second outer magnetic pole parts 9A, 9B, 9C, and 9D are away from each other in the circumferential direction of the magnet ring 1. As a result, although the tooth-shaped front ends of the first and second outer magnetic pole parts are arranged to face to each other in direction of the magnet ring 1 such that the front ends and overlap each other by L in the axial direction of the magnet ring 1, the front ends of the first and second outer magnetic pole parts can be arranged to be spaced from each other without being brought into contact with each other.

Comparison between the present embodiment and the prior art (Japanese Laid-Open Patent Publication (Kokai) No. H09-331666) indicates that: In the prior art, a gap must be formed between the first outer magnetic pole parts and the second outer magnetic pole parts in the axial direction of the magnet ring 1 to prevent crosstalk therebetween. Assuming that the length of the magnet ring 1 is represented by ML and the length of the gap is represented by T1, the length of the outer magnetic pole parts opposed to the magnet ring is equal to (ML−T1)/2.

In contrast, in the present embodiment, the front ends of the first outer magnetic pole parts 8A, 8B, 8C, and 8D, and those of the second outer magnetic pole parts 9A, 9B, 9C, and 9D can be arranged to overlap each other in the axial direction of the magnet ring 1. Assuming that the length of the overlapping portions is represented by L, the length of the first and second outer magnetic pole parts opposed to the magnet ring 1 is equal to (ML+L)/2.

The output torque of the stepper motor is approximately proportional to the area of the outer magnetic pole parts opposed to the magnet ring. Further, in the present embodiment, the first outer magnetic pole parts 8A, 8B, 8C, and 8D, and the second outer magnetic pole parts 9A, 9B, 9C, and 9D are spirally formed, and therefore all the generated electromagnetic forces do not act in the direction of rotation of the rotary shaft 10. As a result, assuming that the spiral angle is represented by θ, the turning force of the stepper motor becomes COSθ times as large as the generated electromagnetic forces. This means that the turning force is reduced, since all the generated electromagnetic forces do not act in the direction of rotation of the rotary shaft 10.

When an increase in the turning force due to an increase in the area of the outer magnetic pole parts opposed to the magnet ring, and a decrease in the turning force caused by the fact that all the generated electromagnetic forces do not act in the direction of rotation of the rotary shaft are both taken into account, the output power of the stepper motor according to the present embodiment becomes $$((ML+L)/(ML-T1))\times \cos\theta$$

times as large as the output power of the prior art.

For example, in the case of the stepper motor having an outer diameter of approximately φ6 mm and an axial dimension of approximately 9 mm, ML=3 mm, L=0.5 mm, T1=0.5 mm, and θ=10 degrees hold. By substituting these values into the above equation, the following expression is obtained:

$$((3+0.5)/(3-0.5))\times \cos 10°$$

The value obtained from the expression is 1.379. Therefore, the output torque of the stepper motor according to the present embodiment is expected to be 1.379 times as large as the output torque of the prior art.

Further, as described hereinabove, the first stator 8 and the second stator 9 are each formed into a simple cup shape with the tooth-shaped parts formed by spirally cutting out the front end of the hollow cylindrical soft magnetic material such that the front end is circumferentially divided into a plurality of tooth shapes axially extending from the end face of the outer tube part. This facilitates the manufacturing and assembly of the first stator 8 and the second stator 9.

The rotary shaft 10 is formed of a soft magnetic material, and rigidly secured to the inner periphery of the magnet ring 1. The rotary shaft 10 is formed with an inner magnetic pole part 10A which has an outer diameter D1. The inner magnetic pole part 10A is disposed at a location for sandwiching the magnet ring 1 between the inner magnetic pole part 10A and the first outer magnetic pole parts 8A, 8B, 8C, and 8D of the first stator 8 opposed to the magnet ring 1, within an axial range where the inner magnetic pole part 10A is opposed to these portions. As described hereinbefore, the second outer magnetic pole parts 9A, 9B, 9C, and 9D of the second stator 9 are arranged to overlap the first outer magnetic pole parts 8A, 8B, 8C, and 8D of the first stator 8 in the axial direction of the magnet ring 1. Therefore, the inner magnetic pole part 10A of the rotary shaft 10 is also opposed to the second outer magnetic pole parts 9A, 9B, 9C, and 9D of the second stator 9.

The rotary shaft 10 has a part 10C inserted into the hollow cylindrical part of the first bobbin 15 around which the first coil 2 is wound. Portions of the inner magnetic pole part 10A of the rotary shaft 10 located in respective angular ranges opposed to the first outer magnetic pole parts 8A, 8B, 8C, and 8D of the first stator 8 are magnetized by the first coil 2 such that they have a polarity opposite to that of the first stator 8. The shape in cross section of the inner magnetic pole part 10A of the rotary shaft 10, in the direction orthogonal to the axis of the rotary shaft 10, is circular, as shown in FIG. 3.

The rotary shaft 10 has a part 10D inserted into the hollow cylindrical part of the second bobbin 16 around which the second coil 3 is wound. Portions of the inner magnetic pole part 10A of the rotary shaft 10 in respective angular ranges opposed to the second outer magnetic pole parts 9A, 9B, 9C, and 9D of the second stator 9 are magnetized by the second coil 3 to have a polarity opposite to that of the second outer magnetic pole parts 9A, 9B, 9C, and 9D of the second stator 9. The rotary shaft 10 is fixedly secured to the magnet ring 1 via the inner magnetic pole part 10A.

As described above, since the inner space of the magnet ring 1 is filled with the inner magnetic pole part 10A of the rotary shaft 10, it is possible to increase the mechanical strength of the magnet ring 1. Further, the inner magnetic pole part 10A of the rotary shaft 10 acts as a back metal, so that the permeance coefficient of the magnetic circuit is set to a high value, whereby even when the magnetic circuit is used under a high-temperature environment, there occurs less magnetic deterioration due to demagnetization.

The first bearing 12 is formed of a non-magnetic material, and fixed to the first stator 8, for rotatably holding a thin shaft part 10E of the rotary shaft 10.

The second bearing 13 is formed of a non-magnetic material, and fixed to the second stator 9, for rotatably holding a thin shaft part 10F of the rotary shaft 10.

Since both the first bearing 12 and the second bearing 13 are formed of a non-magnetic material, it is possible to prevent the former from being attracted by a magnetic force generated between the first stator 8 and the rotary shaft 10, and the latter from being attracted by a magnetic force generated between the second stator 9 and the rotary shaft 10, whereby rotation characteristics and durability of the first bearing 12 and the second bearing 13 are enhanced.

It should be noted that the first bearing 12 and the second bearing 13 may be formed of a soft magnetic material. In this case, the magnetic resistance in the magnetic circuit becomes smaller, and therefore the generated torque itself increases. Of course, attractive forces are generated between the first bearing 12 and the rotary shaft 10, and between the second bearing 13 and the rotary shaft 10, which can cause a torque loss due to frictional forces, or damage the durability of sliding surfaces of the rotary shaft 10 and the bearings 12 and 13.

To overcome the above problems, application of a lubricant, lubricating coating (fluorine-based lubricating coating, graphite-based lubricating coating, molybdenum disulfide-based lubricating coating), lubricating plating (e.g. electroless nickel plating containing PTFE (polytetrafluoroethylene) particles, and Teflon (registered trademark) lubricating electroless nickel plating), or the like is provided on the surfaces of the first bearing 12, the rotary shaft 10, and the second bearing 13. This makes it possible to suppress torque losses caused by friction of the sliding surfaces, and prevent the durability of the sliding surfaces from being impaired, thereby making it possible to configure the stepper motor as one with large output torque.

The first coil 2 is disposed between the outer tube part of the first stator 8 and the rotary shaft 10, and at the same time in the vicinity of a connecting part that connects between the outer tube part of the first stator 8 and the rotary shaft 10 via the first bearing 12. The one end portion of the magnet ring 1 is sandwiched between the first outer magnetic pole parts 8A, 8B, 8C, and 8D of the first stator 8 and the inner magnetic pole part 10A of the rotary shaft 10. Further, the second coil 3 is disposed between the outer tube part of the second stator 9 and the rotary shaft 10, and at the same time in the vicinity of a connecting part that connects between the outer tube part of the second stator 9 and the rotary shaft 10 via the second bearing 13. The other end portion of the magnet ring 1 is sandwiched between the second outer magnetic pole parts 9A, 9B, 9C, and 9D of the second stator 9 and the inner magnetic pole part 10A of the rotary shaft 10.

More specifically, the stepper motor has the following construction: The first outer magnetic pole parts 8A, 8B, 8C, and 8D of the first stator 8, and the second outer magnetic pole parts 9A, 9B, 9C, and 9D of the second stator 9 are opposed to the outer peripheral surface of the magnet ring 1. Further, the inner magnetic pole part 10A of the rotary shaft 10 is located on the inner peripheral surface of the magnet ring 1, and the first outer magnetic pole parts 8A, 8B, 8C, and 8D of the first stator 8 and the inner magnetic pole part 10A of the rotary shaft 10 are opposed to each other. Similarly, the second outer magnetic pole parts 9A, 9B, 9C, and 9D of the second stator 9 and the inner magnetic pole part 10A of the rotary shaft 10 are opposed to each other.

The connection ring 14 is formed into a hollow cylindrical shape, and has grooves 14A, 14B, 14C, 14D, 14E, 14F, 14G, and 14H formed in the inner periphery thereof. Further, the connection ring 14 is formed of a non-magnetic material, and configured to be capable of dividing the magnetic circuit between the first stator 8 and the second stator 9 such that the magnetic pole parts of the first stator 8 and the second stator 9 hardly exert adverse influence on each other.

The grooves 14A, 14C, 14E, and 14G are shifted in phase by 360/n degrees, i.e. 90 degrees, between them. Similarly, the grooves 14B, 14D, 14F, and 14H are shifted in phase by 360/n degrees, i.e. 90 degrees, between them. The first outer magnetic pole parts 8A, 8B, 8C, and 8D of the first stator 8 are fitted in the grooves 14A, 14C, 14E, and 14G, and fixed thereto e.g. by an adhesive. The second outer magnetic pole parts 9A, 9B, 9C, and 9D of the second stator 9 are fitted in the grooves 14B, 14D, 14F, and 14H, and fixed thereto e.g. by an adhesive.

The grooves 14A, 14C, 14E, and 14G are shifted from the grooves 14B, 14D, 14F, and 14H in phase by 90 degrees in terms of electrical angle, i.e. by (180/n) degrees (22.5 degrees in the present embodiment) in terms of mechanical angle, with respect to the magnetization phases of the magnetized parts of the magnet ring 1. As a result, as described hereinabove, the first outer magnetic pole parts 8A, 8B, 8C, and 8D of the first stator 8, which are tooth-shaped, and the second outer magnetic pole parts 9A, 9B, 9C, and 9D of the second stator 9, which are tooth-shaped, are arranged and held in a manner that the first outer magnetic pole parts are shifted from the second outer magnetic pole parts in phase by 90 degrees in terms of electrical angle, i.e. by (180/n) degrees (22.5 degrees in the present embodiment) in terms of mechanical angle, with respect to the magnetization phases of the magnetized parts of the magnet ring 1.

The first stator 8 and the second stator 9 are fixed to the connecting ring 14, as described above, whereby it is possible to arrange the first stator 8 and the second stator 9 at desired locations and phases.

As described above, in the present embodiment, the inner space of the magnet ring 1 is filled with the inner magnetic pole part 10A of the rotary shaft 10, and hence it is possible to make the mechanical strength of the magnet ring 1 larger than that of the prior art (Japanese Laid-Open Patent Publications (Kokai) No. H09-331666 and No. H10-229670). Further, the rotary shaft 10 acts as a so-called back metal that reduces the magnetic resistance between S poles and N poles appearing in the inner periphery side of the magnet ring 1, so that the permeance coefficient of the magnetic circuit is set to a high value, whereby even when the magnetic circuit is used under a high-temperature environment, there occurs less magnetic deterioration due to demagnetization is reduced.

Further, since the first stator 8 and the second stator 9 are each formed into a simple cup shape, i.e. a hollow cylindrical member having cutouts formed therein, they are easy to manufacture. If the first and second stators have constructions shown in the prior art (Japanese Laid-Open Patent Publications (Kokai) No. H09-331666 and No. H10-229670), the first stator 8 and the second stator 9 are each required to integrally form the inner magnetic pole parts with the outer magnetic pole parts. This makes it difficult to make the inner magnetic pole parts and the outer magnetic pole parts if they are to be formed as portions of the same component part.

For example, if the inner magnetic pole parts and the outer magnetic pole parts are molded by metal injection molding, the manufacturing costs increase. Further, if the inner magnetic pole parts and the outer magnetic pole parts are integrally formed with each other by press working, it becomes more difficult to form them, as the component parts are smaller. Further, if the inner magnetic pole part and the outer magnetic pole parts are separately made and then integrally secured to each other by caulking, welding, or bonding, the manufacturing costs increase.

More specifically, the stepper motors according to the prior art (Japanese Laid-Open Patent Publications (Kokai) No. H09-331666 and No. H10-229670) necessitate at least nine component parts in total, i.e. two coils, a magnet ring, an output shaft, a first stator (including two component parts, i.e. one for forming the outer magnetic pole parts, and one for forming the inner magnetic pole part), a second stator (including two component parts, i.e. one for forming the outer magnetic pole parts, and one for forming the inner magnetic pole part), and a connecting ring.

In contrast, the stepper motor according to the present embodiment can be constructed by seven component parts in total, i.e. two coils, a magnet ring, a rotary shaft corresponding to the output shaft, a first stator (component part forming the outer magnetic pole parts), a second stator (component part forming the outer magnetic pole parts), and a connecting ring. This makes it possible to reduce the number of component parts, and hence it is possible not only to reduce the manufacturing costs and but also to facilitate the manufacturing of the stepper motor.

Furthermore, the stepper motors according to the prior art (Japanese Laid-Open Patent Publications (Kokai) No. H09-331666 and No. H10-229670) are required to accurately hold gaps between the outer peripheral surface of the magnet and outer magnetic pole parts when the stepper motor is assembled. Moreover, it is necessary to dispose the inner magnetic pole parts at respective locations opposed to the inner peripheral surface of the magnet, with a predetermined gap between the inner magnetic pole parts and the magnet. However, there is a higher possibility that this gap cannot be secured due to variations in the accuracy of parts and poor assembly accuracy, which causes abutment of the inner magnetic pole parts against the magnet, and causes like other defects.

In contrast, in the stepper motor according to the present embodiment, it is only required to control only the gaps between the outer periphery of the magnet ring 1 and the outer magnetic pole parts, which facilitates assembly of the stepper motor.

Furthermore, in the stepper motors according to the prior art (Japanese Laid-Open Patent Publications (Kokai) No. H09-331666 and No. H10-229670), each stator is formed by two component parts i.e. one forming the inner magnetic pole parts, and one forming the outer magnetic pole parts.

In contrast, in the stepper motor according to the present embodiment, the first stator 8 and the second stator 9 are both formed by respective single component parts. This makes it possible to construct a more accurate stepper motor with less mutual difference between the component parts.

Figure 14:
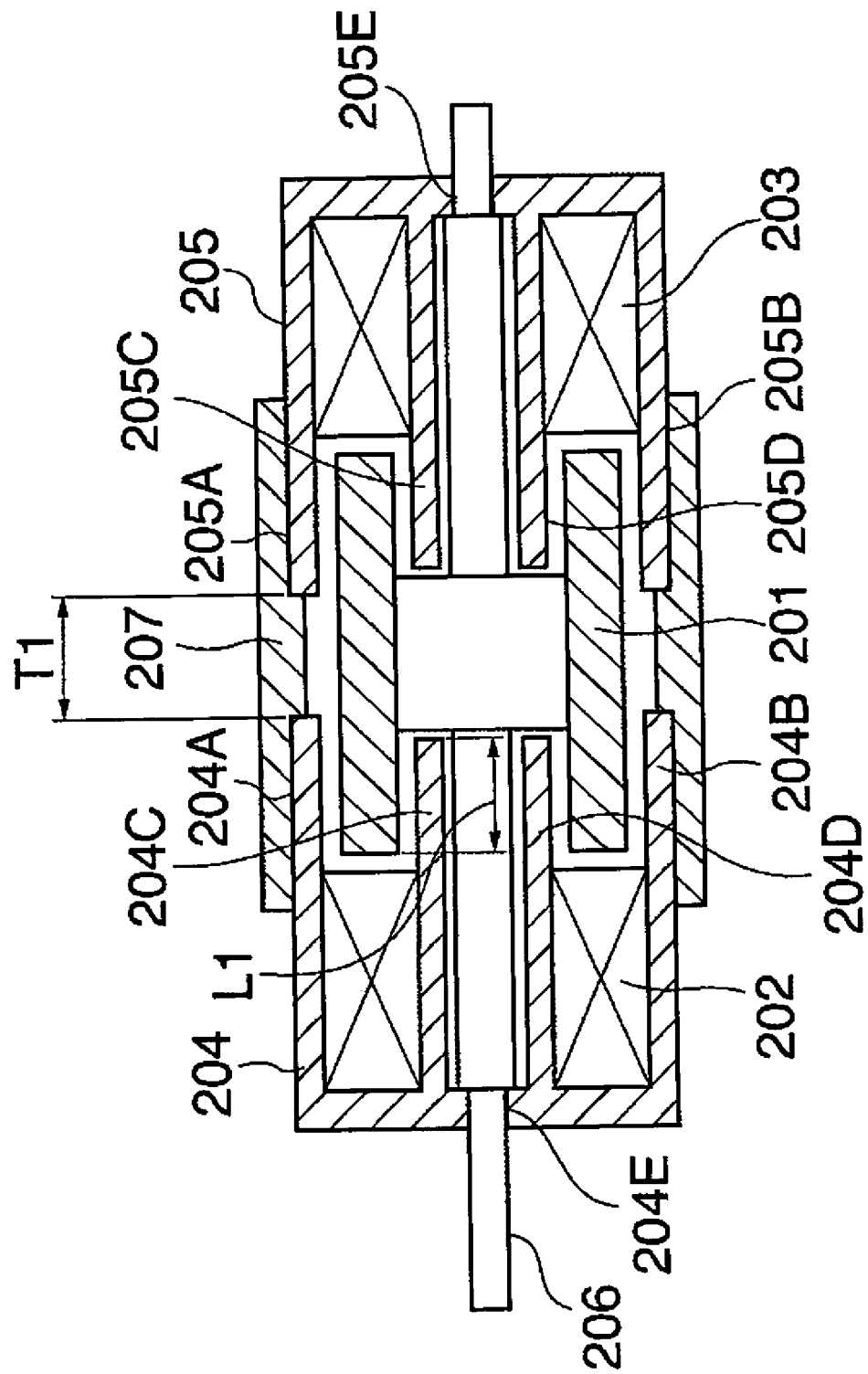
FIG. 14 is a cross-sectional view of the stepper motor shown in FIG. 13, in a state in which the assembly of the stepper motor is completed.

Furthermore, the stepper motors according to the prior art (Japanese Laid-Open Patent Publications (Kokai) No. H09-331666 and No. H10-229670) are required to be configured such that the inner magnetic pole parts are not brought into contact with a portion connecting between the magnet and the output shaft. As a result, the stepper motor cannot have a sufficient axial length (L1 in FIG. 14) in which the inner magnetic pole part and the magnet are opposed to each other.

In contrast, in the stepper motor according to the present embodiment, as shown by ML in FIG. 2, it is possible to easily ensure a sufficient axial length in which the inner magnetic pole part 10A of the rotary shaft 10 and the magnet ring 1 are opposed to each other. This makes it possible to make effective use of the first outer magnetic pole parts 8A, 8B, 8C, and 8D of the first stator 8, the second outer magnetic pole parts 9A, 9B, 9C, and 9D of the second stator 9, and the magnet ring 1, thereby making it possible to enhance the output power of the stepper motor.

Furthermore, comparison between the present embodiment and the prior art (Japanese Laid-Open Patent Publication (Kokai) No. H09-331666), indicates that: The stepper motor according to the prior art is required to form a gap between the first outer magnetic pole parts and the second outer magnetic pole parts in the axial direction of the magnet ring 1, so as to prevent crosstalk between the first and second outer magnetic pole parts. Assuming that the length of the magnet ring 1 is represented by ML and the length of the gap is represented by T1, the length of each outer magnetic pole part opposed to the magnet ring 1 is represented by (ML−T1)/2.

In contrast, in the stepper motor according to the present embodiment, the front ends of the first outer magnetic pole parts 8A, 8B, 8C, and 8D of the first stator 8, and those of the respective associated second outer magnetic pole parts 9A, 9B, 9C, and 9D of the second stator 9 are arranged to overlap each other in the axial direction of the magnet ring 1. Assuming that the length of the overlapping portions is represented by L, the length of the first and second outer magnetic pole parts in opposed relation to the magnet ring 1 is equal to (ML+L)/2, as described above. This makes it possible to make effective use of the magnet ring 1, thereby making it possible to configure the stepper motor as one with large output power.

Next, how the stepper motor according to the present embodiment is driven for rotation will be described with reference to FIGS. 5 to 8.

Figure 5:
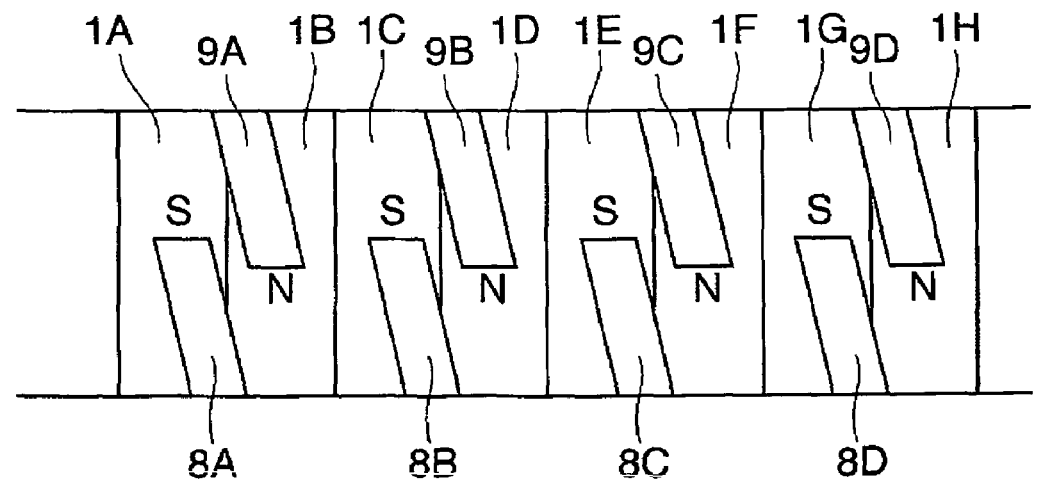
FIG. 5 is an unfolded plan view useful in explaining the rotational motion of the magnet ring.
Figure 6:
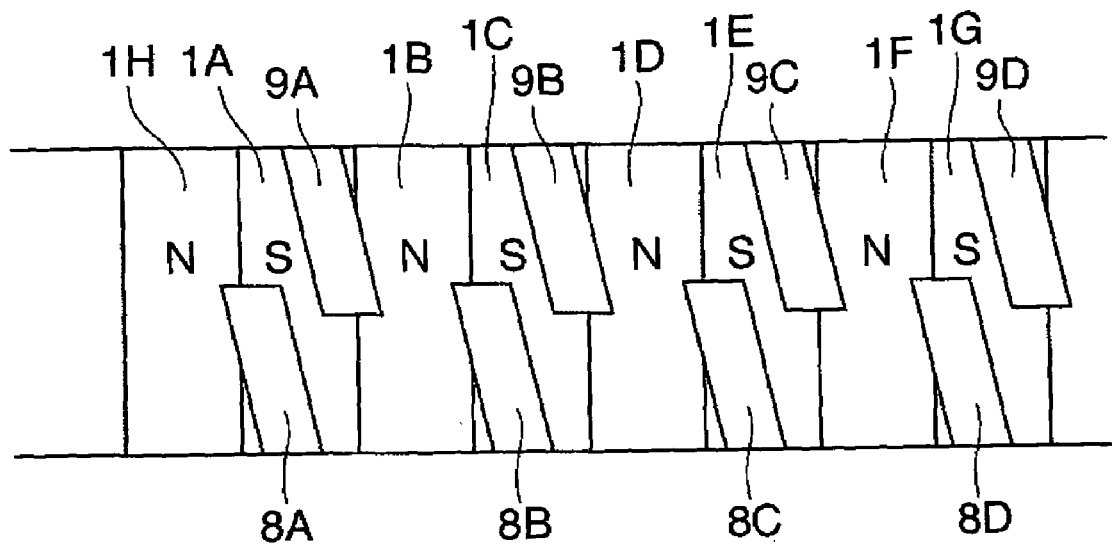
FIG. 6 is an unfolded plan view useful in explaining the rotational motion of the magnet ring.
Figure 7:
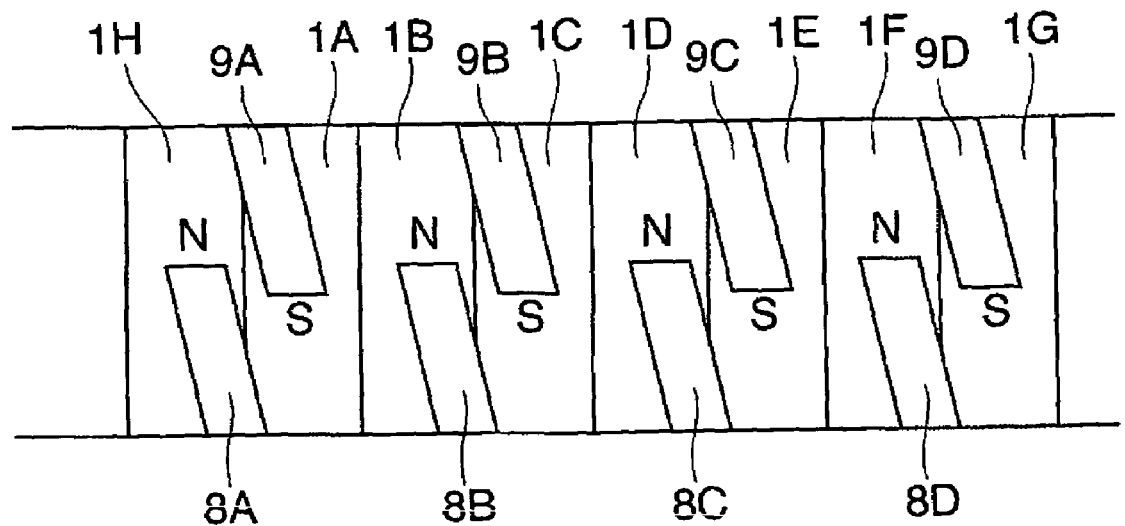
FIG. 7 is an unfolded plan view useful in explaining the rotational motion of the magnet ring.
Figure 8:
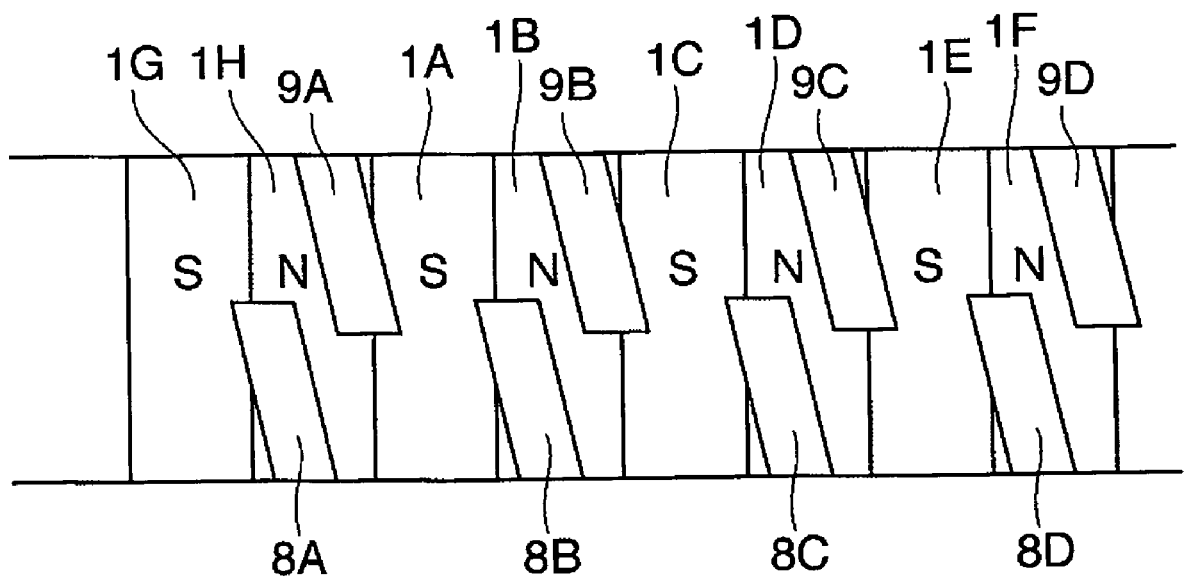
FIG. 8 is an unfolded plan view useful in explaining the rotational motion of the magnet ring.

FIG. 5 shows a state in which the first coil 2 and the second coil 3 are energized, whereby the first outer magnetic pole parts 8A, 8B, 8C, and 8D of the first stator 8 are magnetized into N poles, while the second outer magnetic pole parts 9A, 9B, 9C, and 9D of the second stator 9 are magnetized into S poles.

In the state shown in FIG. 5, the first coil 2 and the second coil 3 are energized so that the first outer magnetic pole parts 8A, 8B, 8C, and 8D of the first stator 8 are magnetized into N poles, and the second outer magnetic pole parts 9A, 9B, 9C, and 9D of the second stator 9 are magnetized into N poles. In accordance with the above magnetizations, the magnet ring 1 as the rotor rotates clockwise, as viewed in FIG. 3, through 11.25 degrees, and is thereby placed in a state shown in FIG. 6.

Then, the energization of the first coil 2 is inverted, whereby the first outer magnetic pole parts 8A, 8B, 8C, and 8D of the first stator 8 are magnetized into S poles, while the second outer magnetic pole parts 9A, 9B, 9C, and 9D of the second stator 9 are magnetized into N poles. In accordance with the above magnetizations, the magnet ring 1 as the rotor further rotates clockwise through 11.25 degrees, and is placed in a state shown in FIG. 7.

Then, the energization of the second coil 3 is inverted, whereby the first outer magnetic pole parts 8A, 8B, 8C, and 8D of the first stator 8 are magnetized into S poles, and the second outer magnetic pole parts 9A, 9B, 9C, and 9D of the second stator 9 are magnetized into S poles. In accordance with the above magnetizations, the magnet ring 1 as the rotor further rotates clockwise through 11.25 degrees, and is placed in a state shown in FIG. 8.

After that, the direction of energization of the first coil 2 and the second coil 3 are sequentially switched, as described above, whereby the magnet ring 1 as the rotor sequentially rotates to positions dependent on the energization phase.

As described hereinabove, according to the present embodiment, magnetic fluxes generated by energization of the first and second coils 2 and 3 are caused to directly act on the magnet ring 1, to thereby construct the stepper motor as one capable of delivering high power and being made very small in size. That is, the stepper motor is only required to have a diameter large enough to include the diameter of the magnet ring 1 and cause the outer magnetic pole parts of the first and second stators 8 and 9 to be opposed to the outer peripheral surface of the magnet ring 1. Further, the stepper motor is only required to have a length equal to a total of the respective lengths of the first and second coils 2 and 3 and the length of the magnet ring 1.

Therefore, the size of the stepper motor is determined by the diameters and the lengths of the magnet ring 1 and the first and second coils 2 and 3, and if the diameters and the lengths of the magnet ring 1 and the first and second coils 2 and 3 are made very small, it is possible to realize microminiaturization of the stepper motor.

Although in this case, it is difficult to maintain the accuracy of the stepper motor if the diameters and the lengths of the magnet ring 1 and the first and second coils 2 and 3 are made very small, this problem can be solved as follows: The magnet ring 1 is formed into a hollow cylindrical shape, as described above, and the rotary shaft 10 is fixedly secured to the inner periphery of the magnet ring 1. Further, the outer magnetic pole parts of the first and second stators 8 and 9 are caused to be opposed to the outer peripheral surface of the magnet ring 1, and the inner magnetic pole part of the rotary shaft 10 is caused to be opposed to the inner peripheral surface of the magnet ring 1. This simple configuration makes it possible to solve the problem of the accuracy of the stepper motor.

Further, by constructing the stepper motor using seven component parts in total, i.e. two coils, a magnet ring, a rotary shaft, first and second stators (component part forming the outer magnetic pole parts), and a connecting ring, it is possible to reduce the number of component parts, thereby making it possible to reduce the manufacturing costs of the stepper motor.

Further, by arranging the front ends of the first outer magnetic pole parts of the first stator 8 and the front ends of the respective associated second outer magnetic pole parts of the second stator 9 to overlap each other in the axial direction of the magnet ring 1, and the length of the outer magnetic pole parts opposed to the magnet ring 1 is equal to (ML+L)/2 where L represents the length of the overlapping portions of the front ends of the first and second outer magnetic pole parts. Thus, it is possible to make effective use of the magnet ring 1, thereby making it possible to realize a high-power stepper motor.

In the following, a second embodiment of the present invention will be explained.

Figure 9:
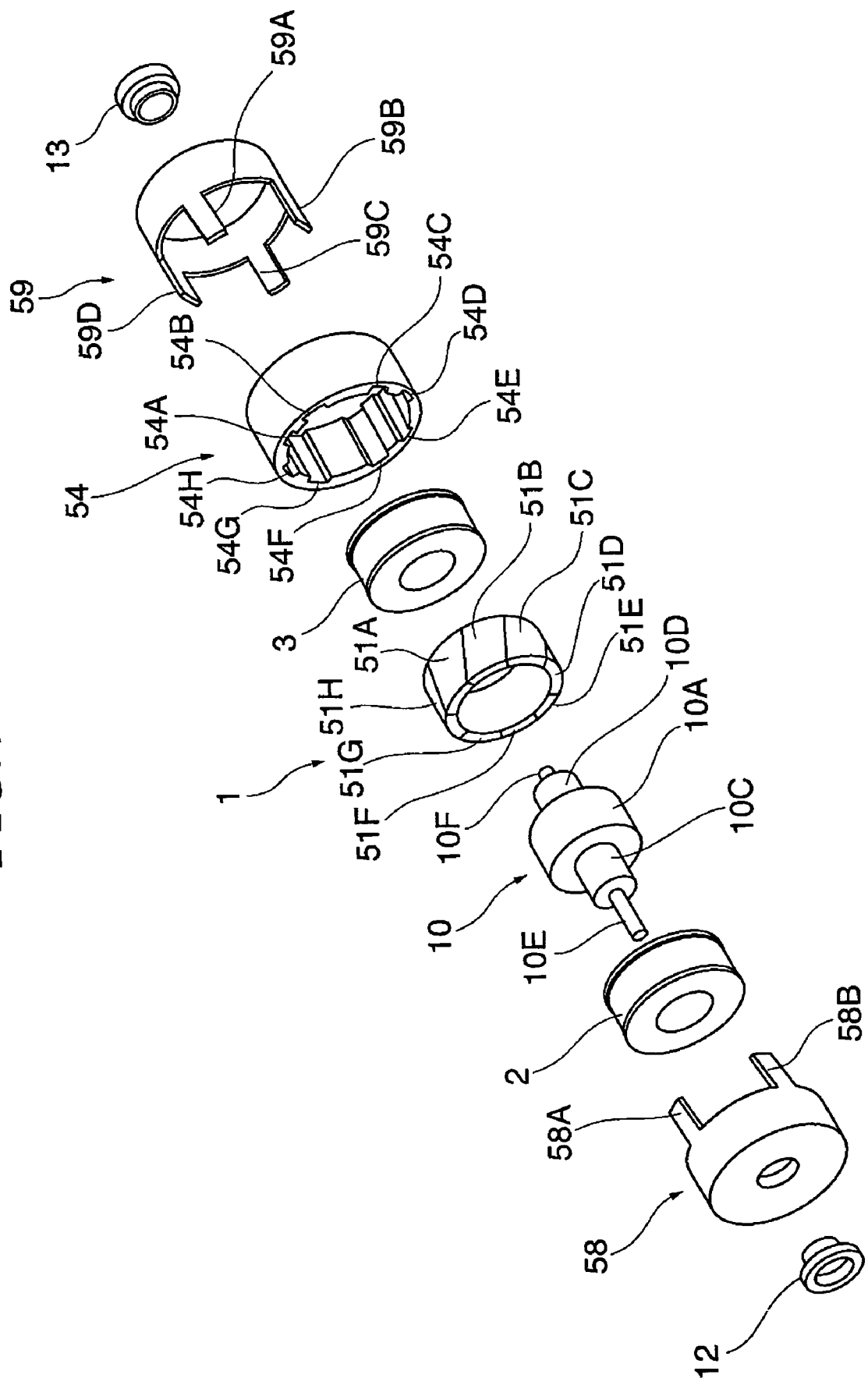
FIG. 9 is an exploded perspective view of a stepper motor according to a second embodiment of the present invention.
Figure 10:
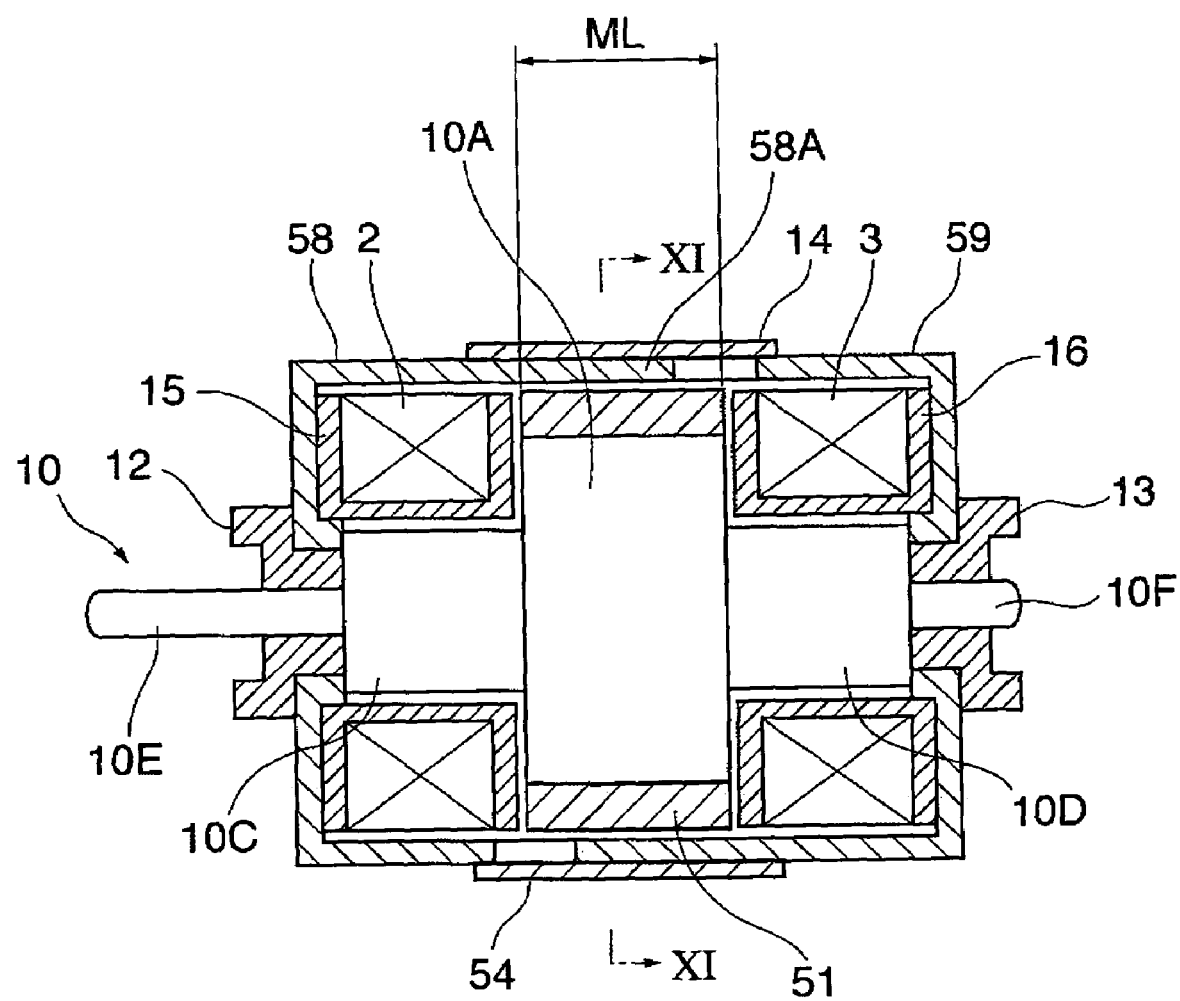
FIG. 10 is a cross-sectional view of the stepper motor shown in FIG. 9, in a state in which the assembly of the stepper motor is completed.

FIG. 9 is an exploded perspective view of a stepper motor according to the second embodiment of the present invention. FIG. 10 is a cross-sectional view of the stepper motor in FIG. 9, in a state in which the assembly of the stepper motor is completed. Further, FIG. 11 a cross-sectional view of the stepper motor, taken on line A-A of FIG. 10, and FIG. 12 is an unfolded plan view showing the relationship between outer magnetic pole parts of stators and a magnet ring.

The present embodiment is distinguished from the first embodiment in that the magnet ring is spirally magnetized, and the first outer magnetic pole parts of the first stator, and the second outer magnetic pole parts of the second stator are formed as tooth-shaped parts extending straight along the direction of the axis of the magnet ring. In the present embodiment, component parts and elements corresponding to those of the first embodiment are designated by identical reference numerals, and detailed description thereof is omitted.

As shown in FIGS. 9 to 12, the stepper motor according to the present embodiment is comprised of a magnet ring 51, the first coil 2, the second coil 3, a first stator 58, a second stator 59, the rotary shaft 10, the first bearing 12, the second bearing 13, a connecting ring 54, the first bobbin 15, and the second bobbin 16.

The magnet ring 51 is formed into a hollow cylindrical shape, and is comprised of magnetized parts 51A, 51B, 51C, 51D, 51E, 51F, 51G, and 51H each of which extends spirally. The magnetized parts 51A to 51H are formed into respective spiral shapes, and arranged adjacent to one another. The magnetized parts 51A, 51C, 51E, and 51G are magnetized into S poles, and the magnetized parts 51B, 51D, 51F, and 51H are magnetized into N poles. A magnetization phase of each of the magnetized parts 51A to 51H varies between different portions of the magnetized part which are different in position as viewed in the axial direction of the magnet ring 51.

Figure 11:
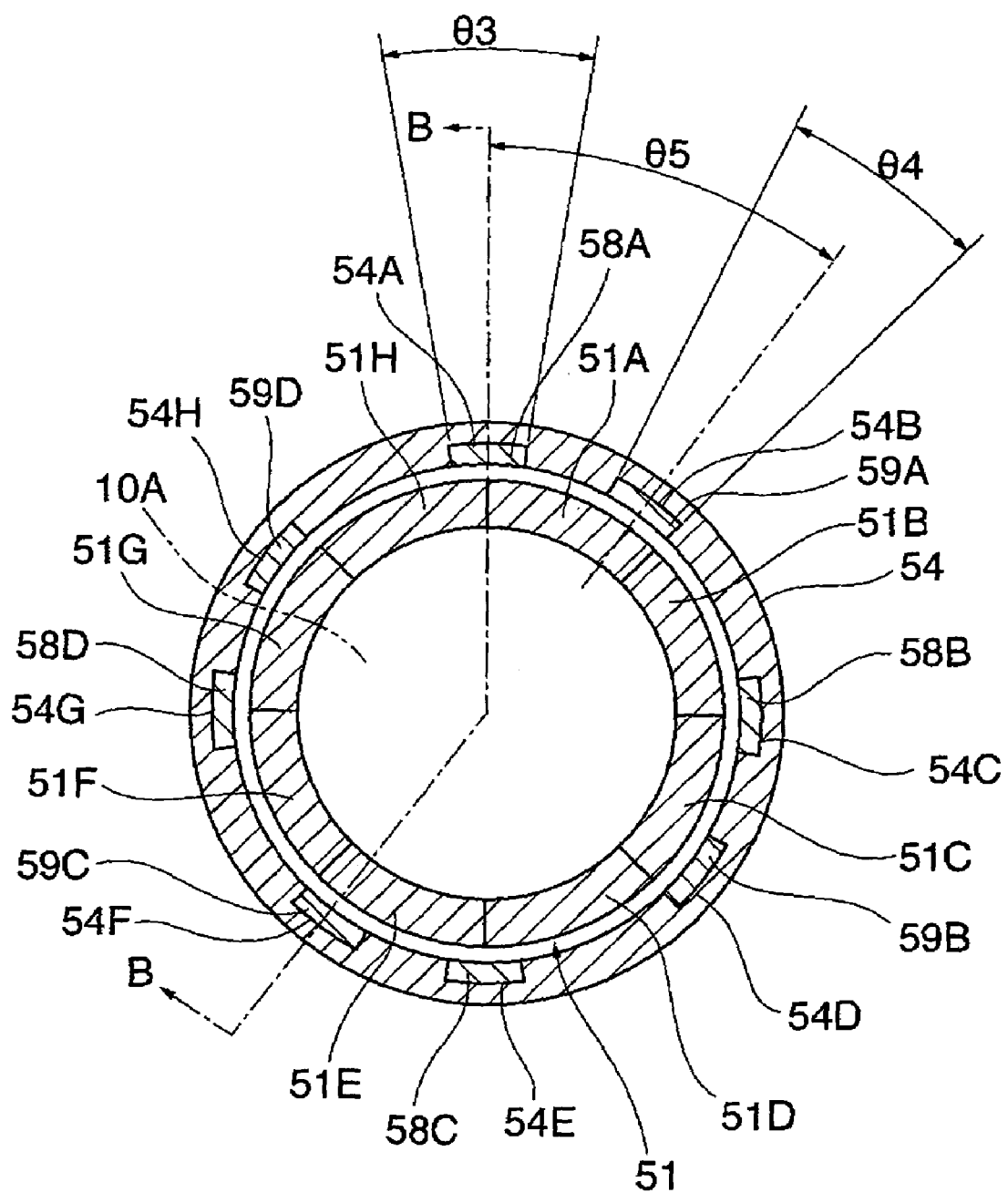
FIG. 11 is a cross-sectional view of the stepper motor, taken on line XI-XI of FIG. 10.
Figure 12:
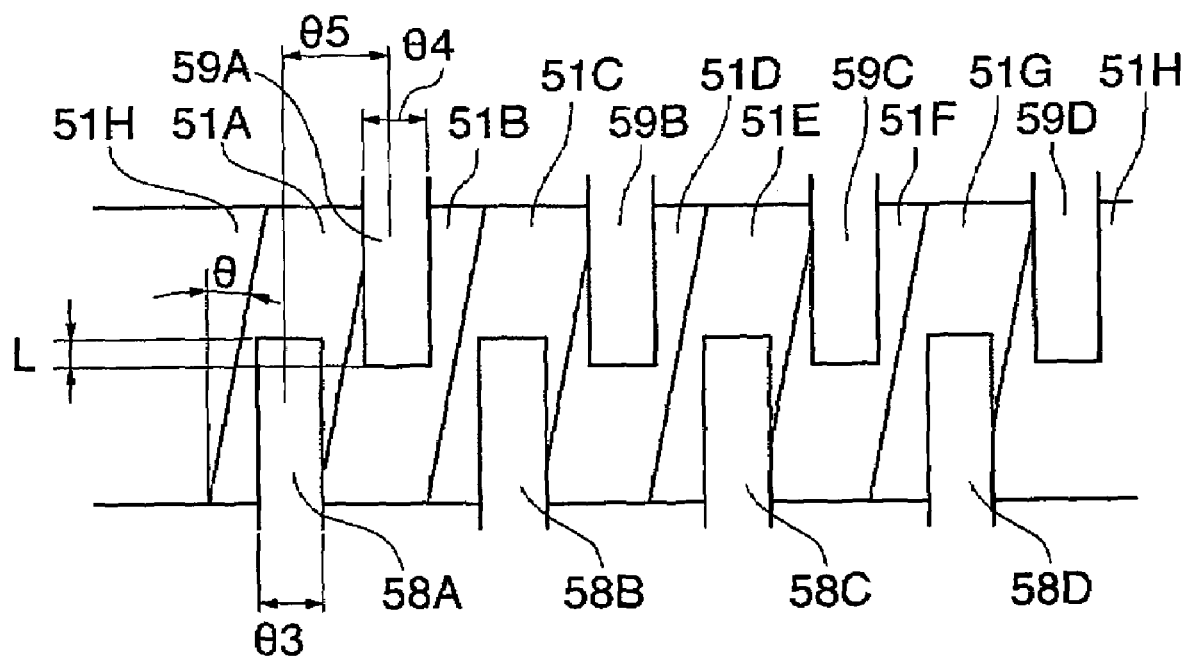
FIG. 12 is an unfolded plan view showing the relationship between outer magnetic pole parts of stators and a magnet ring.
Figure 13:
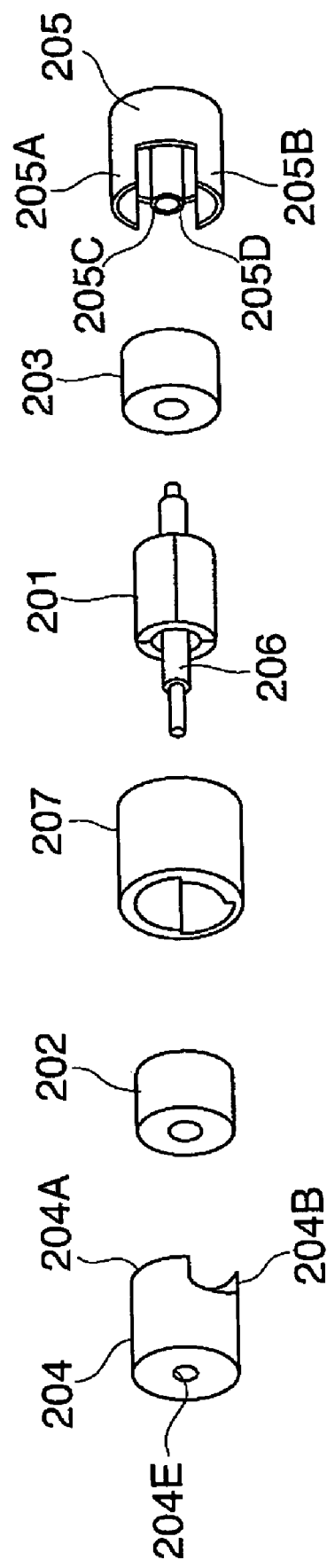
FIG. 13 is an exploded perspective view of a conventional stepper motor.

When the magnet ring 51 is shown in cross section in the direction orthogonal to the axis thereof, as in FIG. 11, eight magnetic pole parts of the magnetized parts 51A to 51H appear on the outer peripheral surface of the magnet ring 51. Although in the present embodiment, by taking tile case where eight poles of the magnetized parts 51A to 51H appear on the outer peripheral surface of the magnet ring 51, as an example, a description is given hereinafter of shapes of yokes etc., but the present invention is by no means limited to a particular number of magnetic pole parts.

The first coil 2 and the second coil 3 have an axis that coincides with the axis of the magnet ring 51, and are arranged along the direction of the axis of the magnet ring 51 at locations across the magnet ring 51 from each other. The outer diameter of the first coil 2 and that of the second coil 3 are set to be substantially equal to that of the magnet ring 51.

The first stator 58 is formed of a soft magnetic material, and is comprised of an outer tube part having a hollow cylindrical shape, tooth-shaped parts formed as outer magnetic pole parts, and cutouts. The first stator 58 is magnetized by the first coil 2. The first stator 58 is formed with first outer magnetic pole parts 58A, 58B, 58C, and 58D which are tooth-shaped and opposed to the outer peripheral surface of the magnet ring 51 with a predetermined gap between the first outer magnetic pole parts 58A, 58B, 58C, and 58D and the outer peripheral surface of the magnet ring 51, and axially extend from a stator body disposed on the side close to one end face of the magnet ring 51 along the outer peripheral surface thereof.

The (n/2) (i.e. four) first outer magnetic pole parts 58A, 58B, 58C, and 58D are arranged at phase intervals of (720/n) (i.e. 90 degrees) in terms of mechanical angle, i.e. at phase intervals of 360 degrees in terms of electrical angle. The first outer magnetic pole parts 58A, 58B, 58C, and 58D are formed as the tooth-shaped parts formed by cutting out the front end of the hollow cylindrical soft magnetic material such that the front end is circumferentially divided into a plurality of tooth shapes each of which axially extends from the end face of the outer tube part. Further, the first outer magnetic pole parts 58A, 58B, 58C, and 58D are formed such that each of them is opposed to the magnet ring 51 inclined thereto at an angle of θ3.

The second stator 59 is formed of a soft magnetic material, and comprised of an outer tube part having a hollow cylindrical shape, tooth-shaped parts formed as outer magnetic pole parts, and cutouts. The second stator 59 is magnetized by the second coil 3. The second stator 59 is formed with second outer magnetic pole parts 59A, 59B, 59C, and 59D which are tooth-shaped and opposed to the outer peripheral surface of the magnet ring 51 with a predetermined gap between the second outer magnetic pole parts 59A, 59B, 59C, and 59D and the outer peripheral surface of the magnet ring 51, and extend from a stator body disposed close to the other end face of the magnet ring 51 along the outer peripheral surface of the magnet ring 1 in the axial direction of the magnet ring 51.

The (n/2) (i.e. four) second outer magnetic pole parts 59A, 59B, 59C, and 59D are arranged at phase intervals of (720/n) (i.e. 90 degrees) in terms of mechanical angle, i.e. at phase intervals of 360 degrees in terms of electrical angle. The second outer magnetic pole parts 59A, 59B, 59C, and 59D are formed as tooth-shaped parts that are formed by cutting the front end of the hollow cylindrical soft magnetic material such that the front end is circumferentially divided into a plurality of tooth shapes each of which axially extends from the end face of the outer tube part. Further, the second outer magnetic pole parts 59A, 59B, 59C, and 59D are formed such that each of them is opposed to the magnet ring 51 inclined thereto at an angle of θ4.

The first outer magnetic pole parts 58A, 58B, 58C, and 58D of the first stator 58, and the second outer magnetic pole parts 59A, 59B, 59C, and 59D of the second stator 59 have the same shape, and are arranged such that the front ends of the tooth-shaped parts of the first and second outer magnetic pole parts are opposed to each other.

The connection ring 54 is formed into a hollow cylindrical shape, and has grooves 54A, 54B, 54C, 54D, 54E, 54F, 54G, and 54H formed in the inner periphery thereof. Further, the connection ring 54 is formed of a non-magnetic material, and configured to be capable of dividing the magnetic circuit formed between the first stator 58 and the second stator 59 such that the magnetic pole parts of the first stator 58 and the second stator 59 hardly exert adverse influence on each other.

The grooves 54A, 54C, 54E, and 54G are shifted from one another in phase by 360/n degrees, i.e. 90 degrees. Similarly, the grooves 54B, 54D, 54F, and 54H are shifted from one another in phase by 360/n degrees, i.e. 90 degrees. The first outer magnetic pole parts 58A, 58B, 58C, and 58D of the first stator 58 are fitted in the grooves 54A, 54C, 54E, and 54G, and fixed thereto e.g. by an adhesive. The second outer magnetic pole parts 59A, 59B, 59C, and 59D of the second stator 59 are fitted in the grooves 54B, 54D, 54F, and 54H, and fixed thereto e.g. by an adhesive. The grooves 54A, 54C, 54E, and 54G are shifted from the grooves 54B, 54D, 54F, and 54H in phase by 90 degrees in terms of electrical angle with respect to the magnetization phases of the magnetized parts of the magnet ring 51.

As described above, the first outer magnetic pole parts 58A, 58B, 58C, and 58D of the first stator 58, and the second outer magnetic pole parts 59A, 59B, 59C, and 59D of the second stator 59 are formed as the tooth-shaped parts extending along the outer peripheral surface of the magnet ring 51 in the axial direction of the magnet ring 51. Further, each magnetized part of the magnet ring 51 is formed into a spiral shape in which the magnetization phase of the magnetized part changes between different portions of the magnetized part which are different in the axial position on the magnetized part. Therefore, to arrange the first outer magnetic pole parts 58A, 58B, 58C, and 58D, and the second outer magnetic pole parts 59A, 59B, 59C, and 59D in respective phase locations quite equivalent to one another, it is necessary to shift the first and second outer magnetic pole parts from one another in phase by α degrees in terms of mechanical angle, with respect to the magnetization phases of the magnetized parts of the magnet ring 51.

To form the grooves 54A, 54C, 54E, and 54G, and the grooves 54B, 54D, 54F, and 54H such that they are shifted in phase from one another by 90 degrees in terms of electrical angle with respect to the magnetization phases of the magnetized parts of the magnet ring 51, it is only required to form them such that they are shifted from one another in phase by (180/n)+α degrees (i.e. 22.5 degrees+α degrees) in terms of mechanical angle with respect to the magnetization phases. Thus, the first outer magnetic pole parts 58A, 58B, 58C, and 58D, and the second outer magnetic pole parts 59A, 59B, 59C, and 59D are also arranged such that they are shifted from one another in phase by (180/n)+α degrees (i.e. 22.5 degrees+α degrees) in terms of mechanical angle, i.e. by 90 degrees in terms of electrical angle with respect to the magnetization phases of the magnetized parts of the magnet ring 51.

Now, assuming that the amount of shift between each of the first outer magnetic pole parts 58A, 58B, 58C, and 58D, and a corresponding one of the second outer magnetic pole parts 59A, 59B, 59C, and 59D in terms of mechanical angle, that is, (180/n)+α degrees (i.e. 22.5 degrees+α degrees) is represented by $\theta 5$, $\theta 5>(\theta 3+\theta 4)/2$ holds, as shown in FIG. 11.

More specifically, the relationship between the angle $\theta 3$, which represents an angle through which the first outer magnetic pole parts 58A, 58B, 58C, and 58D extend in opposed relation to the magnetic pole parts of the magnet ring 51, the angle $\theta 4$, which represents an angle through which the second outer magnetic pole parts 59A, 59B, 59C, and 59D extend in opposed relation to the magnetic pole parts of the magnet ring 51, and the angle $\theta 5$, which represents the phase difference between the first outer magnetic pole parts and the respective adjacent ones of the second outer magnetic pole part, is set such that $\theta 5>(\theta 3+\theta 4)/2$ holds.

By securing the first stator 58 and the second stator 59 to the connecting ring 54, as described above, the first stator 58 and the second stator 59 can be arranged at desired locations and phases.

As is distinct from the stepper motor proposed in Japanese Laid-Open Patent Publication (Kokai) No. H10-229670, in which the bearings for rotatably holding the output shaft inserted into the hollow cylindrical inner magnetic pole parts is mounted to the stator including the inner magnetic pole parts and the outer magnetic pole parts, the stepper motor according to the present embodiment is characterized in that the magnet ring 51 is spirally magnetized, and therefore the front ends of the first outer magnetic pole parts 58A, 58B, 58C, and 58D of the first stator 58, and the front ends of the respective corresponding ones of the second outer magnetic pole parts 59A, 59B, 59C, and 59D of the second stator 59 are arranged such that they are further away from each other by a degrees in terms of mechanical angle.

As a result, even when the gap T1 axially formed between the front ends of the first outer magnetic pole parts 58A, 58B, 58C, and 58D, and the front ends of the respective corresponding ones of the second outer magnetic pole parts 59A, 59B, 59C, and 59D is made smaller, it is possible to secure gaps therebetween. Therefore, even when the gap T1 is made sufficiently small, it is possible to prevent crosstalk between the first outer magnetic pole parts 58A, 58B, 58C, and 58D, and the respective associated ones of the second outer magnetic pole parts 59A, 59B, 59C, and 59D, thereby making it possible make the axial dimension of the stepper motor sufficiently small.

Further, in the present embodiment, assuming that the amount of shift between each of the first outer magnetic pole parts 58A, 58B, 58C, and 58D, and a corresponding one of the second outer magnetic pole parts 59A, 59B, 59C, and 59D in terms of mechanical angle is represented by $\theta 5$, $\theta 5>(\theta 3+\theta 4)/2$ holds. In this expression, $\theta 3$ represents an angle through which the first outer magnetic pole parts 58A, 58B, 58C, and 58D extend in opposed relation to the magnetic pole parts of the magnet ring 51, and $\theta 4$ represents an angle through which the second outer magnetic pole parts 59A, 59B, 59C, and 59D extend in opposed relation to the magnetic pole parts of the magnet ring 51.

With this configuration, even when the front ends of the first outer magnetic pole parts 58A, 58B, 58C, and 58D, and the front ends of the respective corresponding ones of the second outer magnetic pole parts 59A, 59B, 59C, and 59D are arranged such that they overlap each other as viewed in the axial direction of the magnet ring 51, the front ends are not brought into contact with each other. If the length of the overlapping portions is represented by L, the length of the first and second outer magnetic pole parts opposed to the magnet ring 51 is equal to (ML+L)/2.

The output torque of the stepper motor is approximately proportional to the area of the outer magnetic pole parts opposed to the magnet ring 51. Further, in the present embodiment, the magnet ring 51 is spirally magnetized, and therefore all the generated electromagnetic forces do not act in the direction of rotation of the rotary shaft 10. As a result, if the spiral angle is designated by $\theta$, the turning force of the stepper motor becomes COS $\theta$ times as large as the generated electromagnetic force. This means that the turning force is reduced, since all the generated electromagnetic forces do not act in the direction of rotation of the rotary shaft 10.

Assuming that an increase in the turning force due to an increase in the area of the outer magnetic pole parts opposed to the magnet ring, and a decrease in the turning force due to the fact that all the generated electromagnetic forces do not act in the direction of rotation of the rotary shaft are both taken into account, the output of the stepper motor according to the present embodiment becomes $$((ML+L)/(ML-T1))\times COS\ \theta$$

times as large as the output of the prior art.

For example, in the case of the stepper motor having an outer diameter of approximately φ6 mm and an axial dimension of approximately 9 mm, ML=3 mm, L=0.5 mm, T1=0.5 mm, and $\theta$=10 hold, and therefore, if these values are substituted into the above equation, the following expression is obtained:

$$((3+0.5)/(3-0.5))\times COS\ 10°$$

The value obtained from the expression is 1.379. Therefore, the output torque of the stepper motor according to the present embodiment is expected to be 1.379 times as large as the output torque of the prior art.

Furthermore, the stepper motors according to the prior art (Japanese Laid-Open Patent Publications (Kokai) No. H09-331666 and No. H10-229670) are required to be configured such that the inner magnetic pole parts are not brought into contact with a part that connects between the magnet and the output shaft. As a result, the stepper motor cannot have a sufficient length (L1 in FIG. 14) in the axial direction in which the inner magnetic pole part and the rotor (magnet) are opposed to each other.

In contrast, as shown by ML in FIG. 10, according to the stepper motor of the present embodiment, it is possible to easily secure a large axial length over which the inner magnetic pole part 10A of the rotary shaft 10 and the magnet ring 51 are opposed to each other. This makes it possible to make effective use of the first outer magnetic pole parts 58A, 58B, 58C, and 58D of the first stator 58, the second outer magnetic pole parts 59A, 59B, 59C, and 59D of the second stator 59, and the magnet ring 51, thereby making it possible to enhance the output power of the stepper motor.

Furthermore, assuming that the length of the magnet ring 51 is represented by ML, the comparison between the present embodiment and the prior art (Japanese Laid-Open Patent Publication (Kokai) No. H09-331666) gives the following result: The stepper motor according to the prior art is required to form a gap between the first outer magnetic pole parts and the second outer magnetic pole parts in the axial direction of the magnet ring 51, so as to prevent crosstalk between the first and second outer magnetic pole parts. Assuming that the length of the gap is represented by T1, the length of each outer magnetic pole part opposed to the magnet ring is represented by (ML−T1)/2.

In contrast, in the stepper motor according to the present embodiment, the front ends of the first outer magnetic pole parts 58A, 58B, 58C, and 58D of the first stator 58, and those of the respective associated second outer magnetic pole parts 59A, 59B, 59C, and 59D of the second stator 59 are arranged such that they overlap each other in the axial direction of the magnet ring 51. If the length of the overlapping portions is represented by L, the length of the first and second outer magnetic pole parts opposed to the magnet ring 51 is equal to (ML+L)/2, as described above. This makes it possible to make effective use of the magnet ring 51, thereby making it possible to construct a high-power stepper motor.

As described hereinabove, according to the present embodiment, magnetic fluxes generated by energization of the first and second coils 2 and 3 are caused to directly act on the magnet ring 51, whereby the stepper motor is configured to be capable of delivering high power and being made very small in size. That is, the stepper motor is only required to have a diameter large enough to include the diameter of the magnet ring 51 and cause the outer magnetic pole parts of the first and second stators 58 and 59 to be opposed to the outer peripheral surface of the magnet ring 51. Further, the stepper motor is only required to have a length equal to a total of the respective lengths of the first and second coils 2 and 3 and the length of the magnet ring 51.

Therefore, the size of the stepper motor is determined by the diameters and the lengths of the magnet ring 51 and the first and second coils 2 and 3, and if the diameters and the lengths of the magnet ring 51 and the first and second coils 2 and 3 are made very small, it is possible to realize microminiaturization of the stepper motor.

Although in this case, it is difficult to maintain the accuracy of the stepper motor if the diameters and the lengths of the magnet ring 51 and the first and second coils 2 and 3 are made very small, this problem can be solved as follows: The magnet ring 51 is formed into a hollow cylindrical shape, as described above, and the rotary shaft 10 is fixed to the inner periphery of the magnet ring 51. Further, the outer magnetic pole parts of the first and second stators 58 and 59 are caused to be opposed to the outer peripheral surface of the magnet ring 51, and the inner magnetic pole parts of the rotary shaft 10 are caused to be opposed to the inner peripheral surface of the magnet ring 51. This simple construction makes it possible to solve the problem of the accuracy of the stepper motor.

Further, if the stepper motor is comprised of seven component parts in total, i.e. two coils, a magnet ring, a rotary shaft, first and second stators, and a connecting ring, it is possible to reduce the number of component parts, thereby making it possible to reduce the manufacturing costs of the stepper motor.

Further, by arranging the front ends of the first outer magnetic pole parts of the first stator 58, and the front ends of the respective associated second outer magnetic pole parts of the second stator 59 such that they overlap each other in the axial direction of the magnet ring 51, and assuming that the length of the overlapping portions is represented by L, the length of the outer magnetic pole parts opposed to the magnet ring 51 is equal to (ML+L)/2. This makes it possible to make effective use of the magnet ring 51, thereby making it possible to realize a high-power stepper motor.

Although in the above described first and second embodiments, both the first outer magnetic pole parts of the first stator and the second outer magnetic pole parts of the second stator, and the rotary shaft are configured to be opposed to each other within a range in the axial direction, by way of example, this is not limitative, but they may be configured such that the first outer magnetic pole parts of the first stator or the second outer magnetic pole parts of the second stator (i.e. at least either of the first outer magnetic pole parts and the second outer magnetic pole parts), and the rotary shaft are opposed to each other within a range in the axial direction.

This application claims the benefit of Japanese Application No. 2005-092282, filed Mar. 28, 2005, which is hereby incorporated by reference herein in its entirety.

What is claimed is:

1. A driving device comprising:
   a magnet (1) that has a hollow cylindrical shape and is magnetized so as to have alternately different poles in a circumferential direction thereof;
   a first coil (2) and a second coil (3) that are arranged concentric with said magnet (1) and disposed on axially opposite sides of said magnet (1), respectively;
   first outer magnetic pole parts (8A, 8B, 8C, and 8D) that each have a tooth shape and are arranged in opposed relation to said magnet (1) to extend from a side close to one axial end face of said magnet (1) along an outer peripheral surface of said magnet (1), for being magnetized by said first coil (2);
   second outer magnetic pole parts (9A, 9B, 9C, and 9D) that each have a tooth shape and are arranged in opposed relation to said magnet (1) to extend from a side close to another axial end face of said magnet (1) along the outer peripheral surface of said magnet (1), for being magnetized by said second coil (3); and
   a rotary shaft (10) that is fixed to an inner periphery of said magnet (1), and said rotary shaft has an inner magnetic pole part (10A) disposed in opposed relation to at least either of said first outer magnetic pole parts (8A, 8B, 8C, and 8D) and said second outer magnetic pole parts (9A, 9B, 9C, and 9D), for being magnetized by at least one of said first coil (2) and said second coil (3),
   wherein said first outer magnetic pole parts (8A, 8B, 8C, and 8D) and said second outer magnetic pole parts (9A, 9B, 9C, and 9D) are each formed into a spiral shape.

2. A driving device as claimed in claim 1, wherein front ends of said first outer magnetic pole parts (8A, 8B, 8C, and 8D) and front ends of respective associated ones of said second outer magnetic pole parts (9A, 9B, 9C, and 9D) overlap each other in an axial direction of said magnet (1).

3. A driving device as claimed in claim 1, wherein phase positions of said first outer magnetic pole parts (8A, 8B, 8C, and 8D) with respect to respective corresponding magnetization phases of magnetized parts (1A, 1B, 1C, 1D, 1E, 1F, 1G, and 1H) of said magnet (1) and phase positions of said respective associated ones of said second outer magnetic pole parts (9A, 9B, 9C, and 9D) with respect to the respective corresponding magnetization phases of said magnetized parts (1A, 1B, 1C, 1D, 1E, 1F, 1G, and 1H) of said magnet (1) are shifted, respectively, therebetween by a predetermined angle.

4. A driving device comprising:
a magnet (1) that has a hollow cylindrical shape and is magnetized so as to have alternately different poles in a circumferential direction thereof;
a first coil (2) and a second coil (3) that are arranged concentric with said magnet (1) and disposed on axially opposite sides of said magnet (1), respectively;
first outer magnetic pole parts (58A, 58B, 58C, and 58D) that each have a tooth shape and are arranged in opposed relation to said magnet (1) to extend from a side close to one axial end face of said magnet (1) along an outer peripheral surface of said magnet (1), for being magnetized by said first coil (2);
second outer magnetic pole parts (59A, 59B, 59C, and 59D) that each have a tooth shaped and are arranged in opposed relation to said magnet (1) to extend from a side close to another end face of said magnet (1) along the outer peripheral surface of said magnet (1), for being magnetized by said second coil (3); and
a rotary shaft (10) that is fixed to an inner periphery of said magnet (1), and said rotary shaft has an inner magnetic pole part (10A) disposed in opposed relation to at least either of said first outer magnetic pole parts (58A, 58B, 58C, and 58D) and said second outer magnetic pole parts (59A, 59B, 59C, and 59D), for being magnetized by at least one of said first coil (2) and said second coil (3), wherein said magnet (1) is spirally magnetized.

5. A driving device as claimed in claim 4, wherein front ends of said first outer magnetic pole parts (58A, 58B, 58C, and 58D) and front ends of respective associated ones of said second outer magnetic pole parts (59A, 59B, 59C, and 59D) overlap each other in an axial direction of said magnet (1).

6. A driving device as claimed in claim 4, wherein a relationship between an angle $\theta 3$ through which each of said first outer magnetic pole parts (58A, 58B, 58C, and 58D) extends in opposed relation to a corresponding one of magnetic pole parts of said magnet (1), an angle $\theta 4$ through which each of said second outer magnetic pole parts (59A, 59B, 59C, and 59D) extend in opposed relation to a corresponding one of the magnetic pole parts of said magnet (1), and an angle $\theta 5$ as a phase difference between each of said first outer magnetic pole parts (58A, 58B, 58C, and 58D) and each of said second outer magnetic pole part (59A, 59B, 59C, and 59D) adjacent to said each of said first outer magnetic pole parts (58A, 58B, 58C, and 58D) is set such that $\theta 5 > (\theta 3 + \theta 4)/2$ holds.

* * * * *